United States Patent
Ootaka et al.

(10) Patent No.: US 7,853,236 B2
(45) Date of Patent: Dec. 14, 2010

(54) RECTIFIER CIRCUIT AND RFID TAG

(75) Inventors: Shoji Ootaka, Kanagawa (JP);
Toshiyuki Umeda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 317 days.

(21) Appl. No.: 12/185,884

(22) Filed: Aug. 5, 2008

(65) Prior Publication Data

US 2008/0311850 A1 Dec. 18, 2008

Related U.S. Application Data

(63) Continuation of application No. 11/269,791, filed on Nov. 8, 2005, now Pat. No. 7,424,266.

(30) Foreign Application Priority Data

Nov. 9, 2004 (JP) ............................. 2004-325330

(51) Int. Cl.
  *H04B 1/28* (2006.01)
  *H04B 1/04* (2006.01)
(52) U.S. Cl. .................. 455/343.3; 455/333; 455/127.1
(58) Field of Classification Search .................. 455/39, 455/41.1, 41.2, 333, 73, 78, 343.1, 334, 343.3, 455/127.1; 363/44, 48, 125, 127; 340/5.1, 340/5.2, 825.69, 825.72, 572.1, 572.5, 572.7
See application file for complete search history.

(56) References Cited

U.S. PATENT DOCUMENTS

| 4,032,838 | A | 6/1977 | Minami et al. |
| 4,415,894 | A | 11/1983 | Dressler et al. |
| 6,091,935 | A | 7/2000 | Alexander et al. |
| 6,154,014 | A | 11/2000 | Suu |
| 6,630,852 | B2 | 10/2003 | Fujisawa et al. |
| 6,906,500 | B2 | 6/2005 | Kernahan |
| 7,151,436 | B2 | 12/2006 | Fischer et al. |

(Continued)

FOREIGN PATENT DOCUMENTS

JP 2002-152080 5/2002

OTHER PUBLICATIONS

Usami, et al., Powder LSI; An Ultra Small RF Identification Chip for Individual Recognition Applications, ISSCC TD: Embedded Technologies Paper, pp. 398-399, Feb. 2003.

*Primary Examiner*—Sonny Trinh
(74) *Attorney, Agent, or Firm*—Turocy & Watson, LLP

(57) ABSTRACT

A rectifier circuit includes a first MOS transistor; a first capacitor connected between a gate and a source of the first MOS transistor; a first switching circuit for supplying a bias voltage to the first capacitor in response to a control signal; a second MOS transistor whose drain is connected to the source of the first MOS transistor; a second capacitor connected between a gate and a source of the second MOS transistor; and a second switching circuit for supplying the bias voltage to the second capacitor in response to the control signal. The rectifier circuit also includes a third MOS transistor for imitating the first MOS transistor; a third capacitor for imitating the first capacitor; a dummy switching circuit for supplying the bias voltage to the third capacitor in response to the control signal; and a generating circuit for generating the control signal based on a potential of the third capacitor.

19 Claims, 20 Drawing Sheets

U.S. PATENT DOCUMENTS

| | | | |
|---|---|---|---|
| 7,339,485 B2 * | 3/2008 | Ku et al. | 340/636.2 |
| 7,561,866 B2 * | 7/2009 | Oliver et al. | 455/343.3 |
| 7,768,406 B1 * | 8/2010 | Peach et al. | 340/572.7 |
| 2006/0187049 A1 | 8/2006 | Moser et al. | |
| 2008/0080214 A1 | 4/2008 | Umeda et al. | |
| 2008/0158926 A1 | 7/2008 | Umeda et al. | |

\* cited by examiner

RECTIFIER CIRCUIT AND RFID TAG

CROSS-REFERENCE TO RELATED APPLICATIONS

This application is a continuation of U.S. application Ser. No. 11/269,791, filed on Nov. 8, 2005, which claims the benefit of priority from the prior Japanese Patent Application No. 2004-325330, filed on Nov. 9, 2004; the entire contents of which are incorporated herein by reference.

BACKGROUND OF THE INVENTION

1. Field of the Invention

The present invention relates to a rectifier circuit including a diode-connected MOS transistor with a capacitor connected between the gate and source, and a radio frequency identification (RFID) tag including the rectifier circuit.

2. Description of the Related Art

A rectifier circuit converts alternating current (AC) into direct current (DC) through the rectification of diodes. The rectifier circuit, when is provided as a semiconductor integrated circuit, employs a diode-connected MOS transistor whose source and gate are connected to each other as a rectifier diode. The diode-connected MOS transistor is, for example, an NMOS transistor isolated from a substrate through a triple well where the drain and source are connected to an N-well and the source is connected to the back gate connected to a P-well located at the bottom of the transistor. In this NMOS transistor, a diode is provided as a PN junction formed between the source and drain.

An RFID tag, which is recently watched because of its wide application, requires a rectifier circuit. The RFID tag generates a direct-current power-supply voltage for driving the integrated circuit in the RFID tag, and demodulates data signals, from an alternating current induced in a loop antenna. The rectifier circuit serves for the voltage generation and demodulation.

Such a rectifier circuit used in the RFID tag is proposed in, for example, Japanese Patent Application Laid-Open No. 2002-152080 and M. Usami et al., "Powder LSI: An ultra small RF identification chip for individual recognition applications," ISSCC Dig. Tech. Papers, February 2003, pp. 398-399. According to the proposed rectifier circuit, if the MOS transistor is lower in threshold voltage than the PN junction, the rectification properties of the diode-connected MOS transistor depends on the properties of the MOS transistor, and accordingly is approximately the same as the rectification properties of a diode including a MOS transistor whose threshold voltage is equal to the threshold voltage of a PN junction.

However, to perform rectification of the diode, a voltage not less than the threshold voltage of the PIN junction or the threshold voltage of the MOS transistor must be applied across the PN junction, i.e. across the source and drain. The voltage to be applied across the PN junction can be supplied from, for example, a capacitor connected between the gate and source of the MOS transistor and retaining a voltage from zero to the threshold voltage (hereinafter referred as to "bias voltage"). Hence, the rectifier circuit, even if receiving an AC signal with a root-mean-square value of less than the bias voltage, can rectify such a low signal. This means that the RFID tag can receive a weak signal transmitted by a tag reader or writer and the communication range between the RFID tag and the tag reader or writer becomes wider. The wider communication range makes one reader or writer easy to detect plural RFID tags simultaneously, and widens the application range of the RFID tag.

However, since the electric charges stored in the capacitor is discharged through the leakage current of the MOS transistor to which the capacitor is connected, the voltage across the capacitor decreases with time. This means the AC signal that can be rectified increases. In other words, the conversion gain of the rectifier circuit decreases. To keep the conversion gain high, a control signal for charging the capacitor should be periodically transmitted to the rectifier circuit. If the control signal is periodically generated using a counter, charging the capacitor will be needlessly repeated. Such overcharge is undesirable because low power consumption is an important design factor of electronic devices such as the RFID tag.

The bias voltage is preferably almost the threshold voltage of the MOS transistor to be biased. This is because more than the threshold voltage causes the current in the MOS transistor to flow backward, so that the gain of the rectifier circuit decreases. However, even if the bias voltage is fixed to a preset value, the gain of the rectifier circuit may become small due to manufacturing differences of the MOS transistor.

SUMMARY OF THE INVENTION

According to one aspect of the present invention, a rectifier circuit includes a first MOS transistor; a first capacitor configured to connect between a gate and a source of the first MOS transistor; a first switching circuit configured to supply a bias voltage to the first capacitor in response to a control signal; a second MOS transistor whose drain is connected to the source of the first MOS transistor; a second capacitor configured to connect between a gate and a source of the second MOS transistor; a second switching circuit configured to supply the bias voltage to the second capacitor in response to the control signal; a third MOS transistor configured to imitate the first MOS transistor; a third capacitor configured to imitate the first capacitor; a fourth capacitor connected between a drain of the first MOS transistor and the source of the second MOS transistor, a direct current being supplied through the fourth capacitor with respect to an alternating current supplied to the source of the first MOS transistor; a dummy switching circuit configured to supply the bias voltage to the third capacitor in response to the control signal; and a generating circuit configured to generate the control signal based on a potential of the third capacitor.

According to another aspect of the present invention, a radio frequency identification tag includes an antenna; a first MOS transistor; a first capacitor configured to connect between a gate and a source of the first MOS transistor; a first switching circuit configured to supply a bias voltage to the first capacitor in response to a control signal; a second MOS transistor whose drain is connected to the source of the first MOS transistor; a second capacitor configured to connect between a gate and a source of the second MOS transistor; a second switching circuit configured to supply the bias voltage to the second capacitor in response to the control signal; a third MOS transistor configured to imitate the first MOS transistor; a third capacitor configured to imitate the first capacitor; a fourth capacitor connected between a drain of the first MOS transistor and the source of the second MOS transistor; a dummy switching circuit configured to supply the bias voltage to the third capacitor in response to the control signal; a generating unit configured to generate the control signal based on a potential of the third capacitor; a battery configured to be charged with a direct current supplied through the fourth capacitor with respect to an alternating current supplied to the source of the first MOS transistor; and a control circuit configured to transmit tag identification information via the antenna based on the direct current.

According to still another aspect of the present invention, a radio frequency identification tag includes an antenna; a first MOS transistor; a first capacitor configured to connect between a gate and a source of the first MOS transistor; a first switching circuit configured to supply a bias voltage to the first capacitor in response to a control signal; a second MOS transistor whose drain is connected to the source of the first MOS transistor; a second capacitor configured to connect between a gate and a source of the second MOS transistor; a second switching circuit configured to supply the bias voltage to the second capacitor in response to the control signal; a third MOS transistor configured to imitate the first MOS transistor; a third capacitor configured to imitate the first capacitor; a fourth capacitor connected between a drain of the first MOS transistor and the source of the second MOS transistor; a dummy switching circuit configured to supply the bias voltage to the third capacitor in response to the control signal; a generating unit configured to generate the control signal based on a potential of the third capacitor; a supplying unit configured to supply the bias voltage to the third capacitor in response to a reset signal; a battery configured to be charged with a direct current supplied through the fourth capacitor with respect to an alternating current supplied to the source of the first MOS transistor; and a control circuit configured to transmit tag identification information via the antenna based on the direct current, and outputs the reset signal when the control circuit enters suspend state from running state.

DETAILED DESCRIPTION OF THE INVENTION

Exemplary embodiments of a rectifier circuit and an RFID tag including the rectifier circuit according to the present invention will be now described in detail with reference to the accompanying drawings.

A rectifier circuit according to a first embodiment of the present invention includes a dummy MOS transistor that imitates a MOS transistor (hereafter, referred to as "rectifier MOS transistor") serving as a rectifier. The rectifier circuit also monitors a potential of a capacitor connected between the gate and source of the dummy MOS transistor to charge a capacitor connected to the rectifier MOS transistor at the perfect time.

Figure 1:
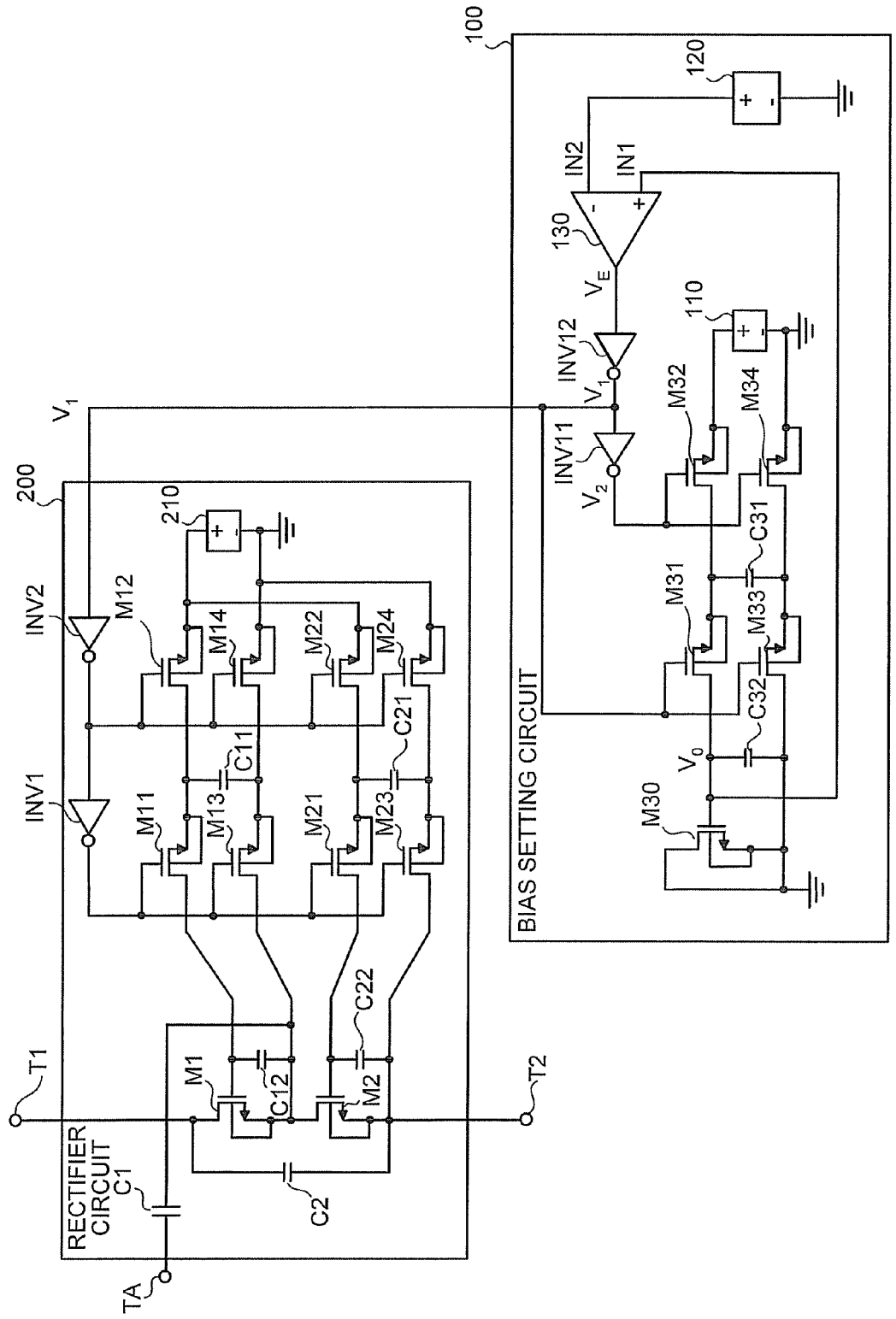
FIG. 1 is a circuit diagram of a rectifier circuit according to a first embodiment.

FIG. 1 is a circuit diagram of the rectifier circuit according to the first embodiment. The rectifier circuit according to the first embodiment includes a rectifier circuit 200 and a bias setting circuit 100 as shown in FIG. 1.

The rectifier circuit 200 includes a rectification circuit for rectifying a received AC signal, and a switching circuit for applying a predetermined potential to a capacitor in rectification circuit.

The rectification circuit is composed of two NMOS transistors M1 and M2 connected in series. The NMOS transistor M1 has a back gate and a source which are connected to each other, and a drain connected to a positive terminal T1. A capacitor C12 is connected between the gate and source of the NMOS transistor M1. This connection makes the NMOS transistor M1 function as a diode because the gate of the NMOS transistor M1 is biased with a voltage across the capacitor.

The NMOS transistor M2 has a back gate and a source which are connected to each other. The source of the NMOS transistor M2 is connected to a negative terminal T2. A capacitor C22 is connected between the gate and source of the NMOS transistor M2. The NMOS transistor M2 functions also as a rectifier like the NMOS transistor M1, and is biased with a voltage across the capacitor C22.

The source of the NMOS transistor M1 and the drain of the NMOS transistor M2 are connected to each other, and a line connecting them is connected to one end of a capacitor C1. The other end of the capacitor C1 is connected to a signal input terminal TA to which an AC signal is input. The capacitor C1 functions as a coupling capacitor. When the rectifier circuit according to this embodiment is used in an RFID tag, the capacitor C1 is connected to an antenna (e.g., a loop antenna) and functions as a series resonance capacitor.

A capacitor C2 is connected between the drain of the NMOS transistor M1 and the source of the NMOS transistor M2, and smoothes the signal half-wave rectified by the NMOS transistors M1 and M2. This smoothing allows the output of a DC voltage from both ends of the capacitor C2, that is, between the positive terminal T1 and the negative terminal T2.

The NMOS transistors M1 and M2 are formed as a triple well structure and are isolated from a substrate. Each source is connected to a p-well located at the bottom of the NMOS transistor, and each drain is connected to an n-well. A diode is thus formed as a PN junction in each MOS transistor.

The switching circuit transfers the voltage supplied from the bias voltage source 210 to the capacitors C12 and C22 according to the control signal V1. The voltage supplied to the capacitors C12 and C22 is a voltage (hereinafter referred to as "bias voltage $V_T$") less than a threshold required for the rectification in the NMOS transistors M1 and M2, for example, ranging from 0 to 1.0 V. The bias voltage $V_T$ is preferably almost the threshold voltage (e.g., 0.6 V). As a result, the NMOS transistors M1 and M2, which constitute a diode circuit, can rectifier an AC signal input to the signal input terminal TA even if the AC signal has a root-mean-square value of less than the threshold voltage. When the bias voltage $V_T$ is, for example, 0.6 V, the diode circuit can rectify an AC signal with a root-mean-square value of approximately 100 mV.

The switching circuit is composed of a plurality of NMOS transistors M11 to M14 and M21 to M24, which function as transfer gates, inverters INV1 and INV2, and the bias voltage source 210. The NMOS transistors M11 and M12 are connected in series and are arranged in a first positive line connected to the positive terminal of the bias voltage source 210. The first positive line is connected from the positive terminal of the bias voltage source 210 to the gate of the NMOS transistor M1 and the one end of the capacitor C12 through the NMOS transistors M12 and M11. The NMOS transistors M13 and M14 are connected in series and are arranged in a first negative line connected to the negative terminal of the bias voltage source 210. The first negative line is connected from the negative terminal of the bias voltage source 210 to the source of the NMOS transistor M1 and the other end of the capacitor C12 through the NMOS transistors M14 and M13. A capacitor C11 is connected between a line connecting the source of the NMOS transistor M11 to the drain of the NMOS transistor M12 and a line connecting the source of the NMOS transistor M13 to the drain of the NMOS transistor M14. In other words, the capacitor C11 is connected between the first positive line and the first negative line.

The NMOS transistors M21 and M22 are connected in series and are arranged in a second positive line connected to the positive terminal of the bias voltage source 210. The second positive line is connected from the positive terminal of the bias voltage source 210 to the gate of the NMOS transistor M2 and the one end of the capacitor C22 through the NMOS transistors M22 and M21. The NMOS transistors M23 and M24 are connected in series and are arranged in a second negative line connected to the negative terminal of the bias voltage source 210. The second negative line is connected to the source of the NMOS transistor M2 and the other end of the capacitor C22 through the NMOS transistors M24 and M23. A capacitor C21 is connected between a line connecting the source of the NMOS transistor M21 to the drain of the NMOS transistor M22 and a line connecting the source of the NMOS transistor M23 to the drain of the NMOS transistor M24. In other words, the capacitor C21 is connected between the second positive line and the second negative line.

Each gate of the NMOS transistors M11, M13, M21, and M23 is connected to the output terminal of the inverter INV1. Each gate of the NMOS transistors M12, M14, M22, and M24 is connected to the input terminal of the inverter INV1. The input terminal of the inverter INV1 is connected to the output terminal of the inverter INV2.

This switching circuit operates as follows. The NMOS transistors M12, M14, M22, and M24 are ON during a period when the control signal V1 input to the inverter INV2 is a logic "low", so that the capacitors C11 and C21 are charged to the bias voltage $V_T$ with the bias voltage source 210. Meanwhile, the output of the inverter INV1 is a logic "low", so that the NMOS transistors M11, M13, M21, and M23 are OFF, and therefore neither capacitor C12 nor C22 is charged. The NMOS transistors M12, M14, M22, and M24 are OFF and the NMOS transistors M11, M13, M21, and M23 are ON during a period when the control signal V1 is a logic "high", so that the charges in the capacitor C11 are transferred to the capacitor C12 and the charges in the capacitor C21 are transferred to the capacitor C22. Consequently, the bias voltage $V_T$ is applied between the gate and source of the NMOS transistor M1 and between the gate and source of the NMOS transistor M2. The control signal V1 input to the inverter INV2 of the rectifier circuit 200 is generated with the bias setting circuit 100. The bias setting circuit 100 includes a dummy rectification circuit, a dummy switching circuit, and a control signal generation circuit. The dummy rectification circuit is a partially-duplicated circuit of the rectification circuit of the rectifier circuit 200 and is composed of an NMOS transistor M30 having the same characteristics as that of the NMOS transistor M1 or M2, and a capacitor C32 corresponding to the capacitor C12 or C22. The NMOS transistor M30 has a back gate and a source, which are connected to each other, and a drain connected to the source and the ground. A capacitor C32 is connected between the gate and source of the NMOS transistor M30. In other words, the dummy rectification circuit imitates one of the rectifiers that constitute the rectification circuit of the rectifier circuit 200.

The dummy switching circuit has a circuit corresponding to the circuit for supplying the bias voltage $V_T$ to the capacitor C12 or C22, out of the switching circuit of the rectifier circuit 200. Referring to FIG. 1, the dummy switching circuit corresponds to a circuit composed of NMOS transistors M31 to M34, a capacitor C31, and inverters INV11 and INV12.

Specifically, the NMOS transistors M31 and M32 are connected in series and are arranged in a positive line connected to the positive terminal of the bias voltage source 110. This positive line is connected to the gate of the NMOS transistor M30 and one end of the capacitor C32 through the NMOS transistors M32 and M31. The NMOS transistors M33 and M34 are connected in series and are arranged in a negative line connected to the negative terminal of the bias voltage source 110. This negative line is connected to the source of the NMOS transistor M30 and the other end of the capacitor C32 through the NMOS transistors M34 and M33. A capacitor C31 is connected between a line connecting the source of the NMOS transistor M31 to the drain of the NMOS transistor M32 and a line connecting the source of the NMOS transistor M33 to the drain of the NMOS transistor M34. Each gate of the NMOS transistors M31 and M33 is connected to the input terminal of the inverter INV11. Each gate of the NMOS transistors M32 and M34 is connected to the output terminal of the inverter INV11. This dummy switching circuit corresponds to the circuit for supplying the bias voltage $V_T$ to the capacitor C12 (C22): the NMOS transistors M11 to M14 (M21 to M24), the capacitor C11 (C21), the inverters INV1 and INV2, and the bias voltage source 210 in the rectifier circuit 200. The bias voltage source 110 supplies the bias voltage $V_T$ like the bias voltage source 210.

The control signal generation circuit monitors the potential of the capacitor C32 in the dummy rectification circuit and generates the control signal V1 based on a result of the monitor. Referring to FIG. 1, the control signal generation circuit corresponds to a circuit composed of the inverter INV12, a reference voltage source 120, and a differential amplifier 130. The differential amplifier 130 has a non-inverting input terminal connected to the gate of the NMOS transistor M30 in the dummy rectification circuit and an inverting input terminal connected to the positive terminal of the reference voltage source 120. The non-inverting input terminal of the differential amplifier 130 is specifically connected to one end of the capacitor C32 (in the positive line). Hereinafter, the potential at the one end of the capacitor C32 is referred to as $V_0$. The reference voltage source 120 generates a reference voltage $V_T$-$V_X$. The voltage $V_X$ will be explained later. In the circuitry as described above, the differential amplifier 130 outputs a differential voltage $V_E$ corresponding to a difference value calculated by subtracting the reference voltage $V_T$-$V_X$ from the potential $V_0$ at the one end of the capacitor C32.

Figure 2:
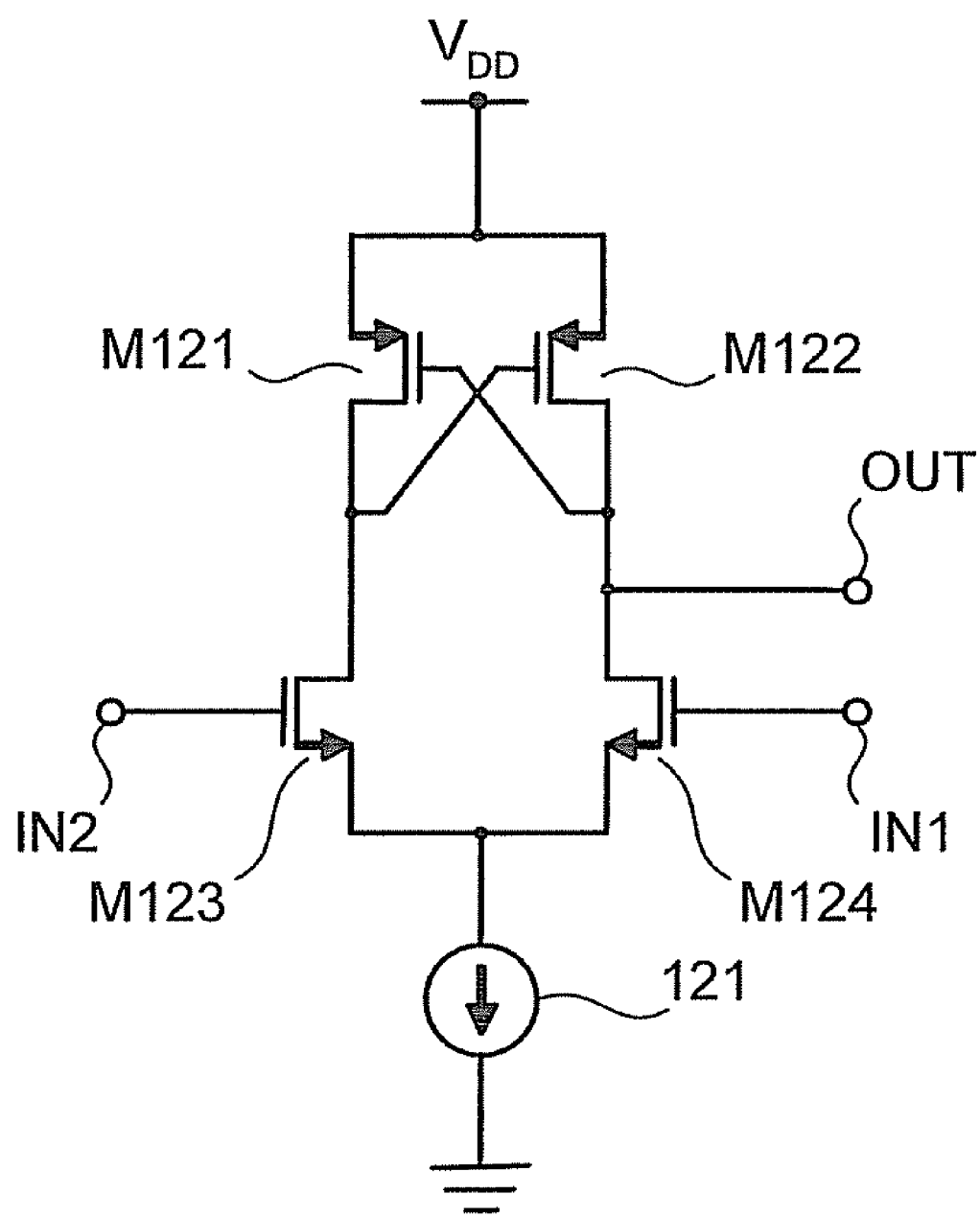
FIG. 2 is a circuit diagram of a differential amplifier.

FIG. 2 is a circuit diagram of an example of the differential amplifier 130. The differential amplifier shown in FIG. 2 is composed of PMOS transistors M121 and M122, which function as load transistors, NMOS transistors M123 and M124, which is provided as a differential pair, and a constant-current source 121. The PMOS transistors M121 and M122 provide a positive feedback by the connection of their gate and drain. The gate of the NMOS transistor M124 corresponds to the non-inverting input terminal IN1 of the differential amplifier 130, and the gate of the NMOS transistor M123 corresponds to the inverting input terminal IN2 of the differential amplifier 130 in FIG. 2. The output terminal OUT connected to the drain of the NMOS transistor M124 corresponds to the output terminal of the differential amplifier 130. The differential amplifiers 130 may be composed of a circuitry other than that shown in FIG. 2, for example, a circuitry having a current mirror pair of load transistors without a positive feedback.

The output terminal of the differential amplifier 130 is connected to the input terminal of the inverter INV12. As a result, the inverter INV12 outputs a logic "low" when the differential voltage $V_E$ output from the differential amplifier 130 reaches not less than a predetermined level, and the inverter INV12 outputs a logic "high" when the differential voltage $V_E$ drops to less than a predetermined level. The signal output from the inverter INV12 is the control signal $V_1$. In other words, the control signal generation circuit outputs the control signal $V_1$ of logic "low" to the rectifier circuit 200 if the potential of the capacitor C32 in the dummy rectification circuit is not less than a potential calculated by subtracting the voltage $V_X$ from the bias voltage $V_T$. The output terminal of the inverter INV12 is connected to the input terminal of the inverter INV11, and therefore the control signal V1 is also input to the dummy switching circuit. As a result, the dummy rectification circuit and the dummy switching circuit imitate the rectification circuit and the operation of the switching circuit of the rectifier circuit 200, respectively.

As described above, in the rectifier circuit 200 and the bias setting circuit 100, the bias voltage source 210 and the bias voltage source 110 must generate the bias voltage $V_T$, which is a constant voltage, respectively. However, there is a possibility that the bias voltage $V_T$ does not indicate a desired value because of the manufacturing differences of the electronic devices that constitute the bias voltage source. The same is true for the reference voltage source 120.

Figure 3A:
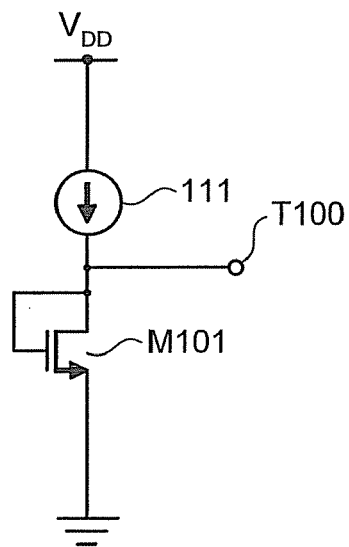
FIGS. 3A to 3D are circuit diagrams showing various examples of a bias voltage source or a reference voltage source.

FIGS. 3A to 3D are circuit diagrams showing various examples of a bias voltage source or a reference voltage source used in the rectifier circuit according to the embodiment. The voltage source shown in FIG. 3A is composed of an NMOS transistor M101 whose gate and drain are connected to each other, and a current source 111 that generates a weak current $I_{BB}$ from a power supply voltage $V_{DD}$. The output terminal T100 is connected to the drain of the NMOS transistor M101, and the gate-to-source voltage of the NMOS transistor M101 generated from the current $I_{BB}$ is output therefrom. Since the gate-to-source voltage is approximately the same as the threshold voltage of the NMOS transistor M101, the voltage source can supply the gate-to-source voltage as the bias voltage $V_T$ and thus be used as the bias voltage source 210 and the bias voltage source 110. This is on the basis of the theory that in general the characteristic of a MOS transistor is represented by $I_D=\beta(V_{GS}-V_{th})^2$, and the low current $I_D$ makes the voltage $V_{GS}$ between the gate and source almost equal to the threshold voltage $V_{th}$.

Since the NMOS transistor M101 is taken out of a semiconductor wafer where the NMOS transistors M1 and M2 of the rectifier circuit 200 and the NMOS transistor M30 of the bias setting circuit 100 are formed, the NMOS transistor M101 has almost the same characteristic as these NMOS transistors M1, M2, and M30. The bias voltage $V_T$ to be generated is approximately the same as the threshold voltage of the NMOS transistors M1 and M2 that constitute the rectification circuit of the rectifier circuit 200 in at least the same rectifier circuit. In other words, the bias voltage $V_T$ need not be set as an absolute value, and the operation of the rectifier circuit is not influenced by the manufacturing differences among the rectifier circuits. Moreover, if β, which is a scale factor, is larger, the gate-to-source voltage $V_{GS}$ can be approximately the same as the reference voltage $V_T$-$V_X$ to use the voltage source shown in FIG. 3A as the reference voltage source 120. Here, the voltage $V_X$ is, for example, 50 mV or less.

Figure 3B:
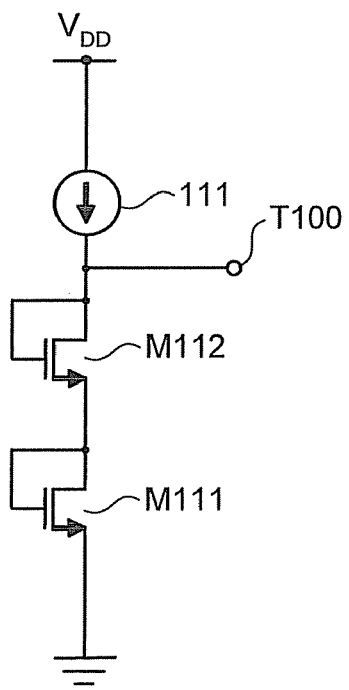

The voltage source shown in FIG. 3B is composed of two NMOS transistors M111 and M112, each of which has a gate and drain connected to each other, and the current source 111 that generates a weak current $I_{BB}$ as that in FIG. 3A. The NMOS transistors M111 and M112 are connected in series. The output terminal T100 is connected to the drain of the NMOS transistor M112, and the sum of the gate-to-source voltage of the NMOS transistor M112 generated by the current $I_{BB}$ and the gate-to-source voltage of the NMOS transistor M111 is output therefrom. Each threshold voltage of the NMOS transistors M111 and M112 is smaller than each threshold voltage of the NMOS transistors M1 and M2 of the rectifier circuit 200 and the threshold voltage of the NMOS transistor M30 of the bias setting circuit 100, and is a value such that the sum of the gate-to-source voltages becomes equal to the bias voltage $V_T$ or the reference voltage $V_T$-$V_X$. Thus, the voltage source can be used as the bias voltage sources 210 and 110 or the reference voltage source 120 without influence of the manufacturing differences even if the voltage source that includes a plurality of the MOS transistors each having a threshold lower than that of any of the NMOS transistors M1, M2, and M30 is used. It should be noted that since their threshold voltages are not the same, the manufacturing differences is distinct.

Figure 3C:
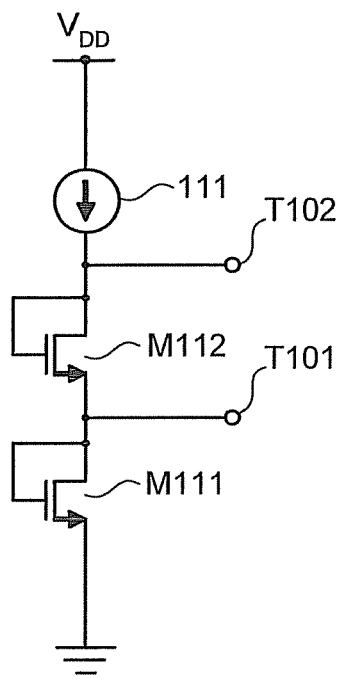

The voltage source shown in FIG. 3C is an example of another voltage source that includes a first output terminal T102 connected to the drain of the NMOS transistor M112, and a second output terminal T101 connected to the drain of the NMOS transistor M111 in the voltage source shown in FIG. 3B. In this example, the bias voltage $V_T$ is output from the first output terminal T102, and the reference voltage $V_T$-$V_X$ is output from the second output terminal T101, by adjusting β and the threshold voltage of the NMOS transistors M111 and M112.

Figure 3D:
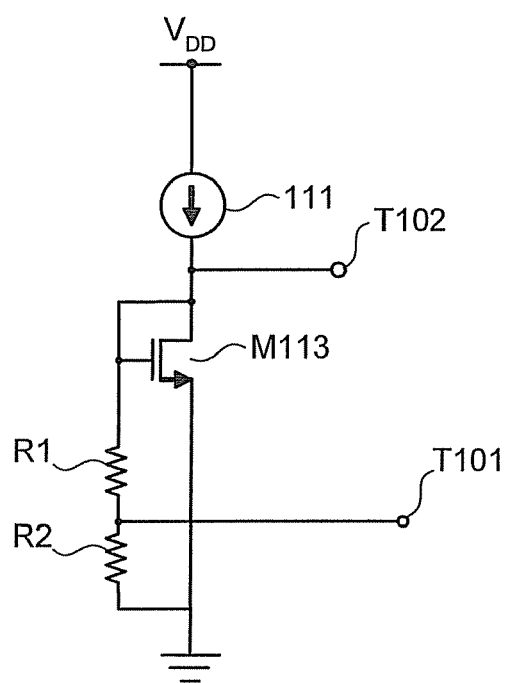

In the voltage source shown in FIG. 3D, the current of current source 111 flows through an NMOS transistor M113 and resistors R1 and R2. This is another example of the circuit in which the bias voltage $V_T$ is output from the first output terminal T102 and the reference voltage $V_T$-$V_X$ is output from the second output terminal T101. The gate-to-source voltage of the NMOS transistor M113, i.e., the bias voltage $V_T$ is applied across the resistors R1 and R2 because of the low current flowing through the NMOS transistor M113.

From the second output terminal T101, R2/(R2+R1) times the bias voltage $V_T$ is output. Adjusting the resistances of the resistors R1 and R2 can generate the voltage of $V_T-V_X$.

Figure 4:
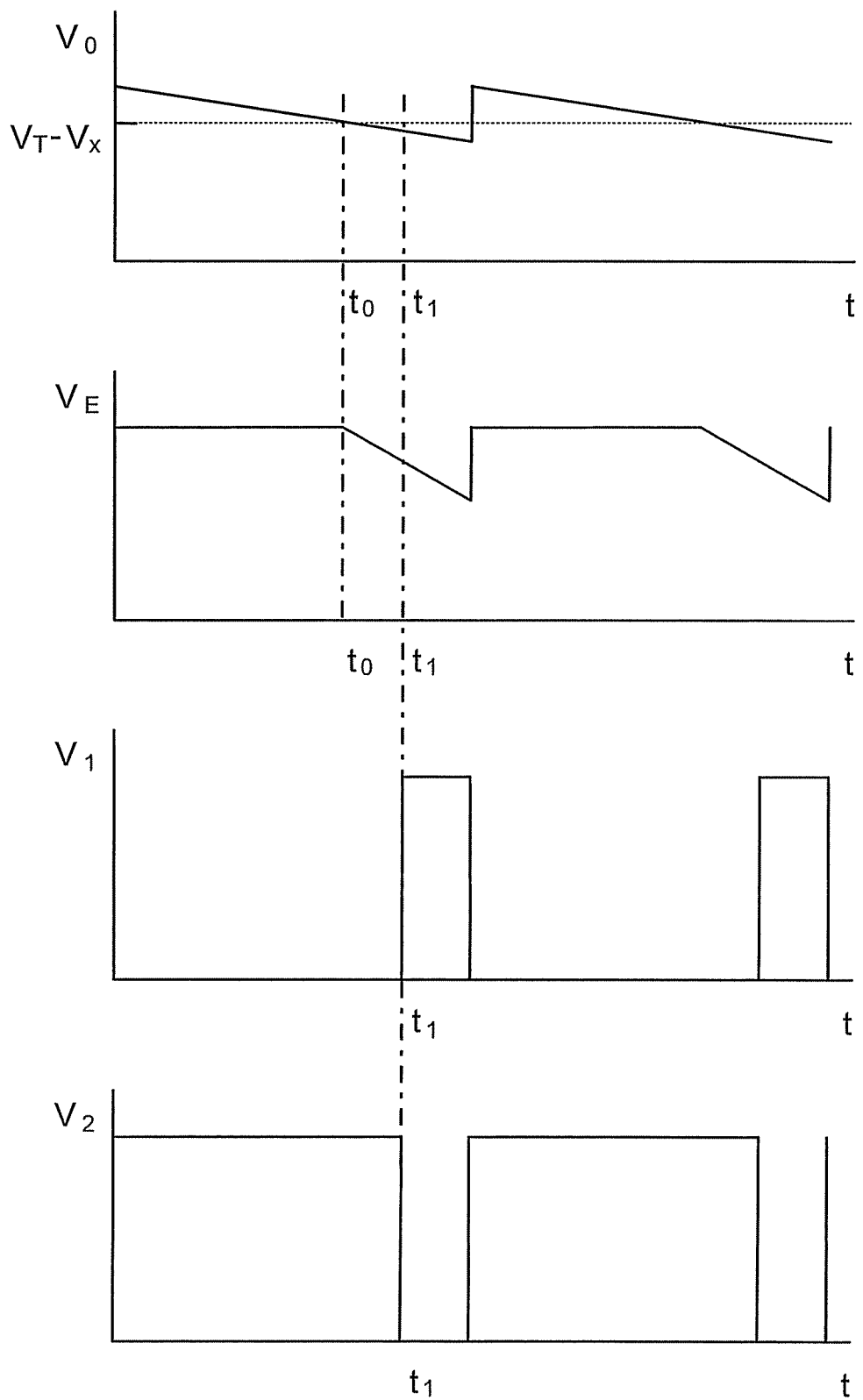
FIG. 4 is a timing chart of a bias setting circuit of the rectifier circuit according to the first embodiment.

The operation of the bias setting circuit 100 will be described below. FIG. 4 is a timing chart of the potential $V_0$ at one end of the capacitor C32, the differential voltage $V_E$ output from the differential amplifier 130, the control signal $V_1$ of the inverter INV12, and a signal V2 output from the inverter INV11.

The differential amplifier 130 outputs the positive differential voltage $V_E$ saturated to a predetermined value during a time period when the potential $V_0$ is more than the reference voltage $V_T-V_X$, i.e. until time $t_0$ (the first phase). This positive differential voltage $V_E$ is a logic "high" for the inverter INV12. Consequently, during the time period, the control signal $V_1$ of the inverter INV12 is a logic "low" and the signal $V_2$ of the inverter INV11 is a logic "high". As a result, the NMOS transistors M32 and M34 are turned ON, and the bias voltage $V_T$ of the bias voltage source 110 is applied to the capacitor C31, so that the potential of the capacitor C31 is the bias voltage $V_T$.

Since the capacitor C32 is discharged through leakage current of the NMOS transistor M30, the potential $V_0$ decreases gradually and finally becomes smaller than the reference voltage $V_T-V_X$ (the second phase). Specifically, the differential voltage $V_E$ output from the differential amplifier 130 decreases gradually from the positive saturated level, and finally becomes an input signal of logic "low" for the inverter INV12 (time $t_1$: the third phase). As a result, the control signal $V_1$ of the inverter INV12 becomes a logic "high", and the potential $V_2$ of the inverter INV12 becomes a logic "low". Moreover, the NMOS transistors M31 and M33 are turned ON, and the potential $V_T$ of the capacitor C31 is applied to the capacitor C32. Specifically, the potential $V_0$ of the capacitor C32 is almost equal to the potential $V_T$ more than the reference voltage $V_T-V_X$, so that there becomes the first phase. After that, the first to third phases are repeated.

The control signal $V_1$ is a pulse generated periodically during the phase repetition. The rectifier circuit 200 operates in synchronization with the control signal $V_1$, and the dummy rectification circuit and the dummy switching circuit of the bias setting circuit 100 imitate the rectification circuit and the switching circuit of the rectifier circuit 200, respectively. Therefore, it is possible to charge the capacitors C12 and C22 of the rectification circuit in the rectifier circuit 200 with the bias setting circuit 100 without waste at the perfect time, and thus to constantly bias the NMOS transistors M1 and M2 that constitute the rectification circuit to the voltage more than a predetermined value at any time. In other words, the gain of the rectifier circuit 200 can be maintained at more than a predetermined level at any time.

Though the circuits as described above employs the NMOS transistors, PMOS transistors may be used instead.

According to the rectifier circuit of the first embodiment, the capacitors C12 and C22 are monitored through the bias setting circuit 100, and the control signal $V_1$ for determining the time of charging the capacitors C12 and C22 is generated based on a result of the monitor. As a result, it is possible to prevent overcharge and thus to reduce power consumption.

Moreover, since the bias voltage $V_T$ applied to the capacitors C12 and C22 and the reference voltage $V_T-V_X$ used in the bias setting circuit 100 are generated based on the threshold voltage of another NMOS transistor designed based on the characteristics of the NMOS transistors M1 and M2, the bias voltage $V_T$ and the reference voltage $V_T-V_X$ are not influenced by the manufacturing differences of the rectifier circuits, and thus the rectifier circuit can have a more than desired gain at any time.

A rectifier circuit according to a second embodiment differs from the rectifier circuit according to the first embodiment in that an initialization function is added.

There is a possibility that the potential of the capacitor C32 is much lower than the reference voltage $V_T-V_X$ in the bias setting circuit 100 shown in FIG. 1, in an initial state of the rectifier circuit. In this state, the potential $V_0$ of the capacitor C32 may be still lower than the reference voltage $V_T-V_X$ even if the charges in the capacitor C31 is transferred to the capacitor C32. In other words, the third phase is not entered in the phase repetition shown in FIG. 4, and thus the pulse of the control signal $V_1$ is not generated. To prevent this state, in the second embodiment, a bias voltage by-pass unit for completely applying the bias voltage $V_T$ to the capacitor C32 is provided in the bias setting circuit.

Figure 5:
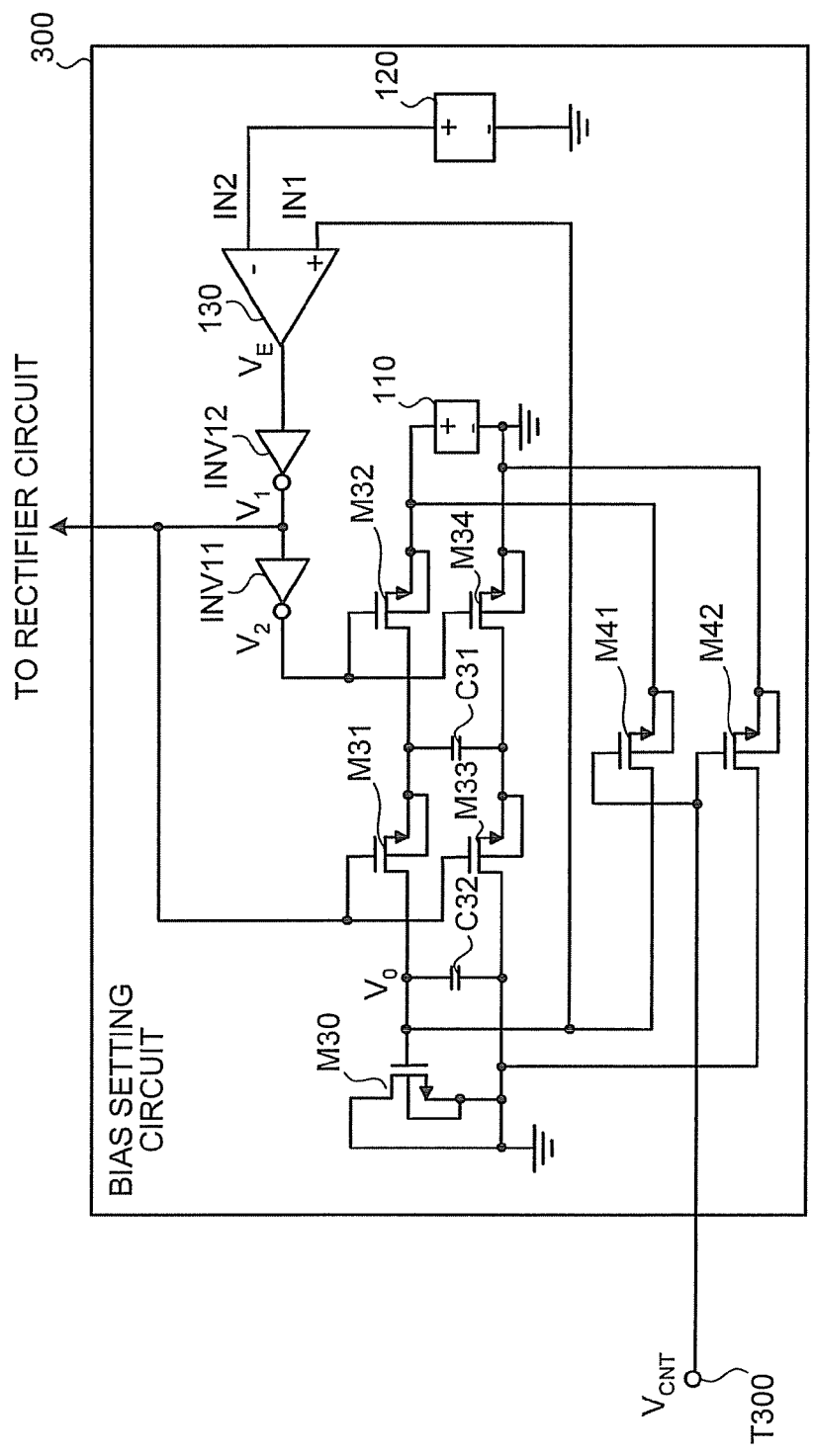
FIG. 5 is a circuit diagram of a bias setting circuit of a rectifier circuit according to a second embodiment.

FIG. 5 is a circuit diagram of a bias setting circuit of a rectifier circuit according to a second embodiment. In FIG. 5, the same components as those in FIG. 1 are labeled by the same reference characters, and therefore the components is not explained here.

The bias voltage by-pass unit is composed of NMOS transistors M41 and M42 in the bias setting circuit 300 shown in FIG. 5. The NMOS transistor M41 has a source connected to the positive terminal of the bias voltage source 110 and a drain connected to one end (in the positive line) of the capacitor C32. The NMOS transistor M42 has a source connected to the negative terminal of the bias voltage source 110 and a drain connected to the other end (in the negative line) of the capacitor C32. The gates of the NMOS transistors M41 and M42 are both connected to a reset terminal T300. A reset signal $V_{CNT}$ is input to the reset terminal T300.

Figure 6:
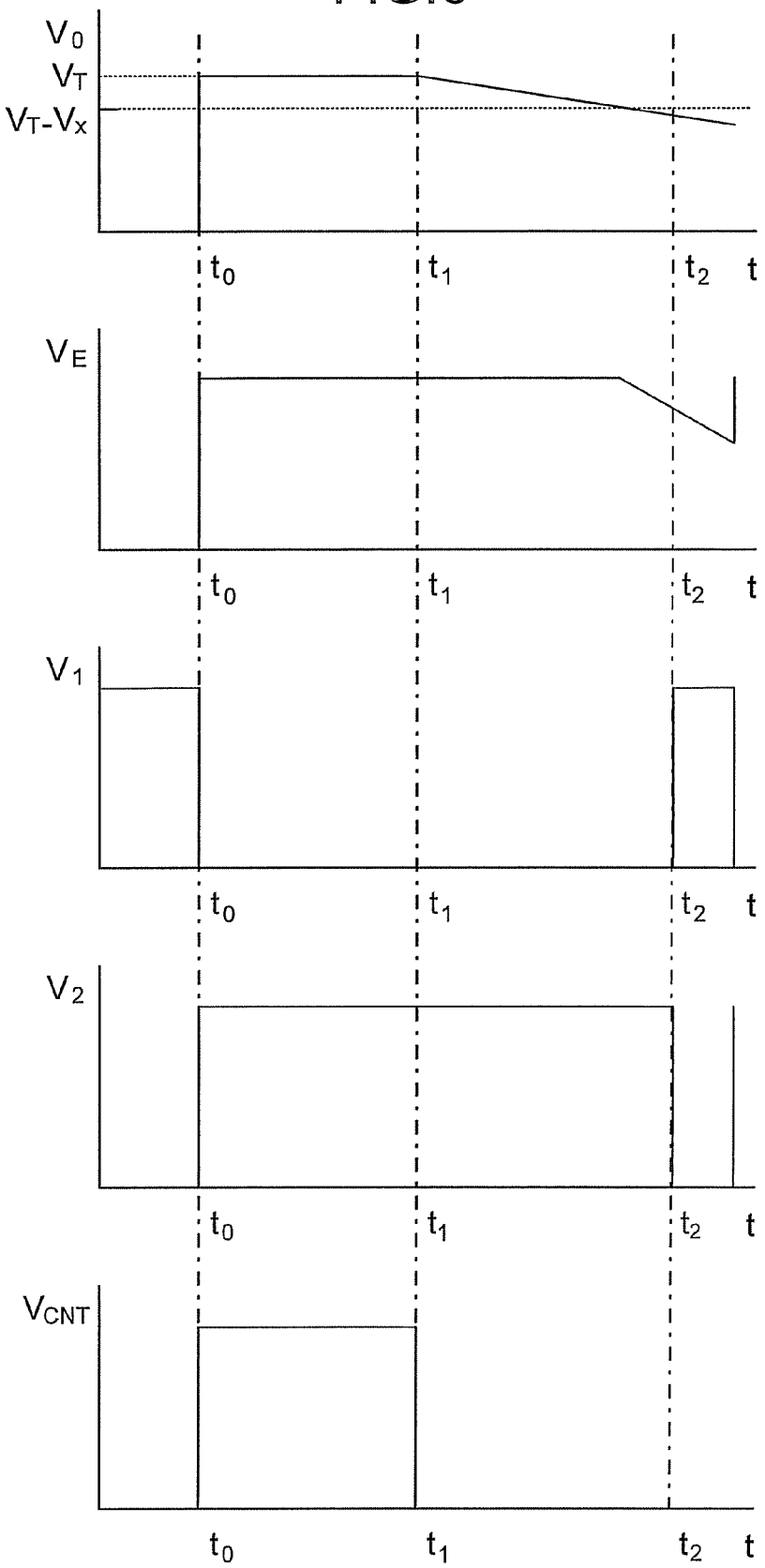
FIG. 6 is a timing chart of the bias setting circuit of the rectifier circuit according to the second embodiment.

The operation of the bias setting circuit 300 will be described below. FIG. 6 is a timing chart of the potential $V_0$ at one end of the capacitor C32, the differential voltage $V_E$ output from the differential amplifier 130, the control signal $V_1$ output from the inverter INV12, the signal $V_2$ output from the inverter INV11, and the reset signal VCNT.

As shown in FIG. 6, the NMOS transistors M41 and M42 are both ON when the pulse of the reset signal VCNT is input, i.e., during a time period when the reset signal VCNT is a logic "high" (period t0-t1), so that the bias voltage $V_T$ supplied from the bias voltage source 110 is supplied to the capacitor C32 not through the dummy switching circuit. Therefore, the potential $V_0$ of the capacitor C32 becomes equal to the bias voltage $V_T$. After that, on the trailing edge of the pulse of the reset signal VCNT, i.e., when the reset signal VCNT is a logic "low", the operation enters the first phase. Since the signal $V_2$ output from the inverter INV11 during a time period when the potential $V_0$ of the capacitor C32 is equal to the bias voltage $V_T$ (period $t_0-t_1$), the NMOS transistors M32 and M34 are both ON, so that the bias voltage $V_T$ is also applied to the capacitor C31. This means that the second and third phases following the first phase are executed.

Figure 7:
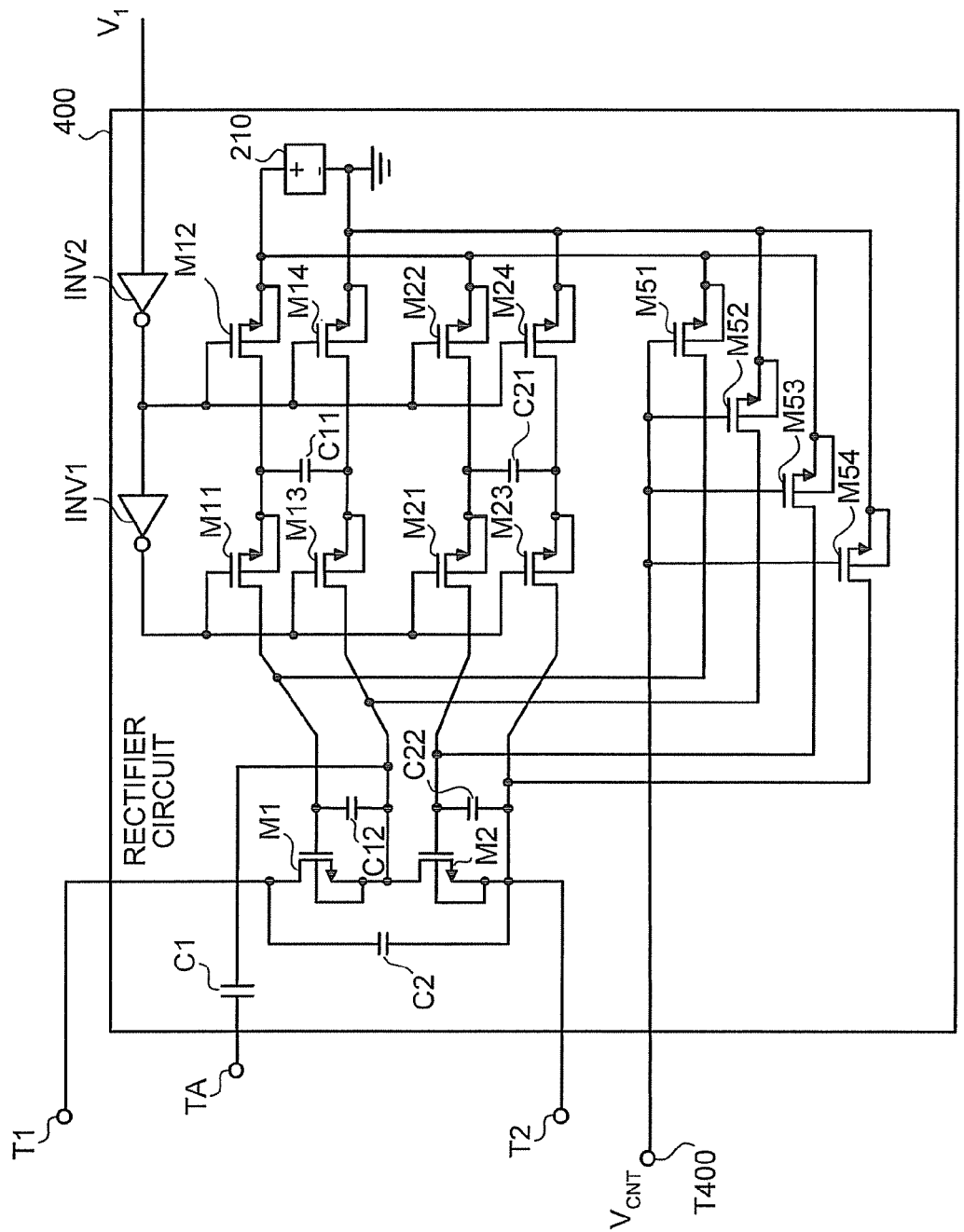
FIG. 7 is a circuit diagram of a rectifier circuit of the rectifier circuit according to the second embodiment.

The bias voltage by-pass unit as described above may be provided in not only the bias setting circuit but also a rectifier circuit. FIG. 7 is a circuit diagram of the rectifier circuit of the rectifier circuit according to the second embodiment. In FIG. 7, the same components as in the rectifier circuit 200 shown in FIG. 1 are labeled by the same reference characters, and therefore, the components is not explained here. The bias voltage by-pass unit is composed of NMOS transistors M51 to M54 in the rectifier circuit 400 shown in FIG. 7. The NMOS transistor M51 has a source connected to the positive terminal of the bias voltage source 210 and a drain connected to one end (in the first positive line) of the capacitor C12. The NMOS transistor M52 has a source connected to the negative terminal of the bias voltage source 210 and a drain connected to the other end (in the first negative line) of the capacitor C12. The NMOS transistor M53 has a source connected to the positive terminal of the bias voltage source 210 and a drain connected to one end (in the second positive line) of the capacitor C22. The NMOS transistor M54 has a source connected to the negative terminal of the bias voltage source 210 and a drain connected to the other end (in the second negative line) of the capacitor C22. Each gate of the NMOS transistors M51 to M54 is connected to a reset terminal T400. The reset signal $V_{CNT}$ is input to the reset terminal T400.

This bias voltage by-pass unit causes the rectifier circuit 400 to operate in the initial stage according to the same timing chart shown in FIG. 6. Specifically, the bias voltage $V_T$ supplied from the bias voltage source 210 is applied to the capacitors C12 and C22 in the rectification circuit and the capacitors C11 and C21 in the switching circuit by the reset signal $V_{CNT}$.

Figure 8:
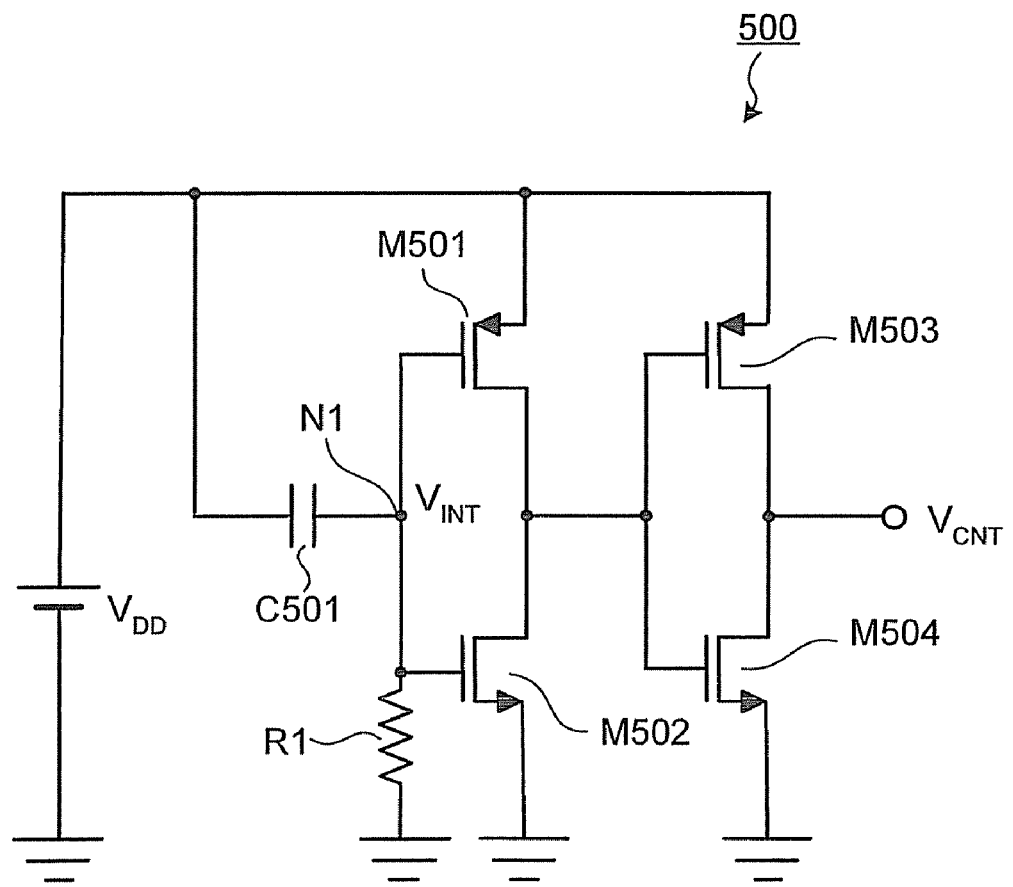
FIG. 8 is a circuit diagram of a power detector circuit generating a reset signal.

The reset signal $V_{CNT}$ can be generated through the power supply detection at, for example, starting the rectifier circuit. FIG. 8 is a circuit diagram of a power detector circuit for generating the reset signal $V_{CNT}$. The power detector circuit 500 shown in FIG. 8 includes a capacitor C501, a first CMOS inverter composed of a PMOS transistor M501 and an NMOS transistor M502, a second CMOS inverter composed of an PMOS transistor M503 and an NMOS transistor M504, and a pull-down resistor R1. One end of the capacitor C501 and each source of the PMOS transistors M501 and M503 are all connected to a power supply line $V_{DD}$. Each drain of the NMOS transistors M502 and M504 is connected to the ground. The other end of the capacitor C501 is connected to the input terminal of the first CMOS inverter, i.e., each gate of the PMOS transistor M501 and the NMOS transistor M502. The output terminal of the first CMOS inverter, i.e., each drain of the PMOS transistor M501 and the NMOS transistor M502 is connected to the input terminal of the second CMOS inverter, e.g., each gate of the PMOS transistor M503 and the NMOS transistor M504. The output terminal of the second CMOS inverter, i.e., each drain of the PMOS transistor M503 and the NMOS transistor M504 is connected to an output terminal from which the reset signal $V_{CNT}$ is output. The pull-down resistor R1 is connected between the gate of the NMOS transistor M502 and the ground.

Figure 9:
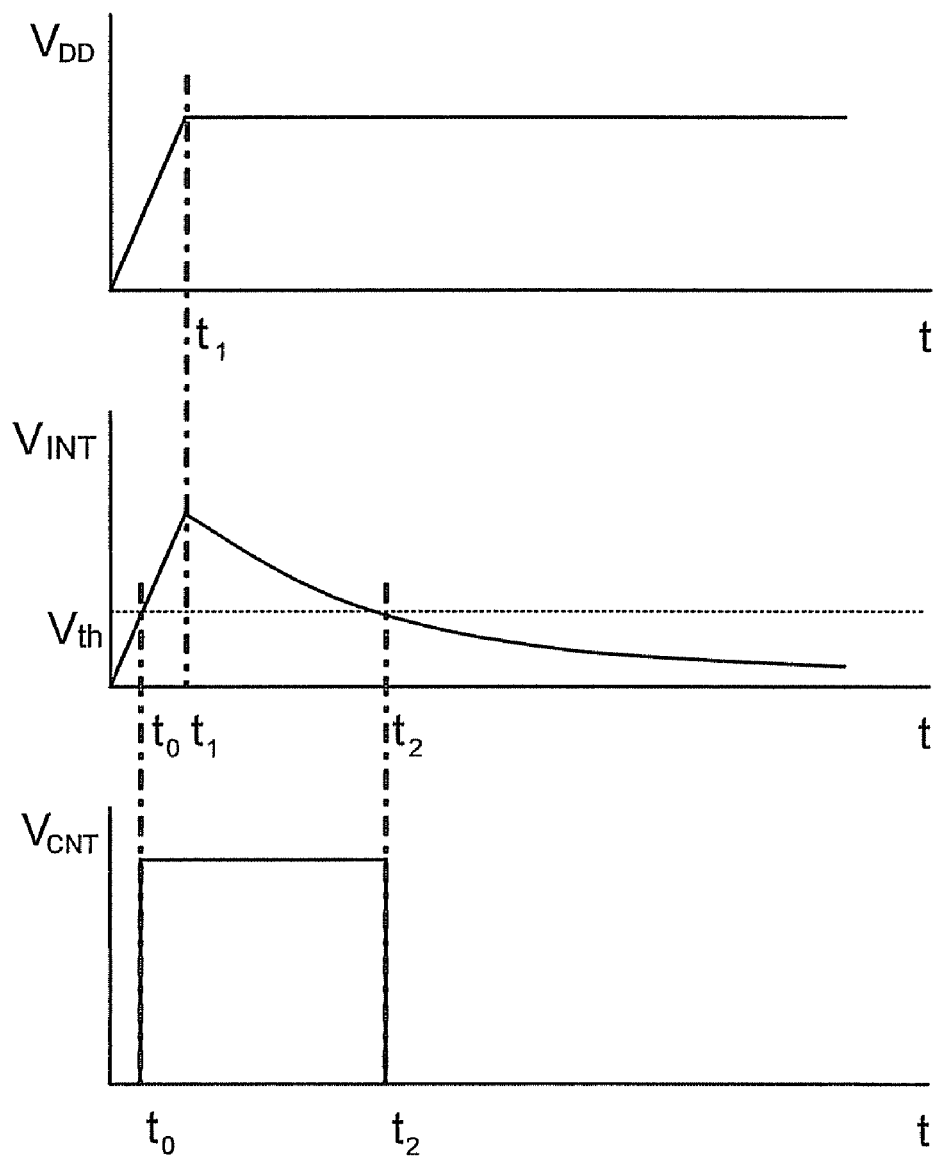
FIG. 9 is a timing chart of the power detector circuit of the rectifier circuit according to the second embodiment.

The operation of the power detector circuit 500 will be described below. FIG. 9 is a timing chart of the potential $V_{INT}$ at the other end of the capacitor C501 (potential at a node N1 in FIG. 8) and the reset signal $V_{CNT}$ to be generated. When a power supply voltage $V_{DD}$ is caused at the starting of the rectifier circuit, the capacitor C501 is charged on the leading edge of the power supply voltage $V_{DD}$ (until time $t_1$. The potential $V_{INT}$ of the input terminal of the first CMOS inverter also rises during the leading, is accepted by the first CMOS inverter as a signal of logic "high" when reaching the threshold voltage $V_{th}$ of the NMOS transistor M502 (time to). As a result, the first CMOS inverter outputs a signal of logic "low", and the second CMOS inverter outputs the reset signal $V_{CNT}$ of logic "high". After the capacitor C501 has been charged (after time $t_1$), the potential $V_{INT}$ gradually decreases to the ground potential through the pull-down resistor R1, and finally becomes lower than the threshold voltage $V_{th}$ of the NMOS transistor M502 (time $t_2$). As a result, the first CMOS inverter outputs a signal of logic "high", and the second CMOS inverter outputs the reset signal of logic "low". According to the above operation, the power detector circuit 500 can generate the pulsed reset signal $V_{CNT}$ at the starting of the rectifier circuit.

As described above, the rectifier circuit according to the second embodiment can apply the bias voltage VT as an initial value to the capacitor C32 in the bias setting circuit 300 to be monitored and the capacitor C31 repeatedly applied with the bias voltage $V_T$.

Figure 10:
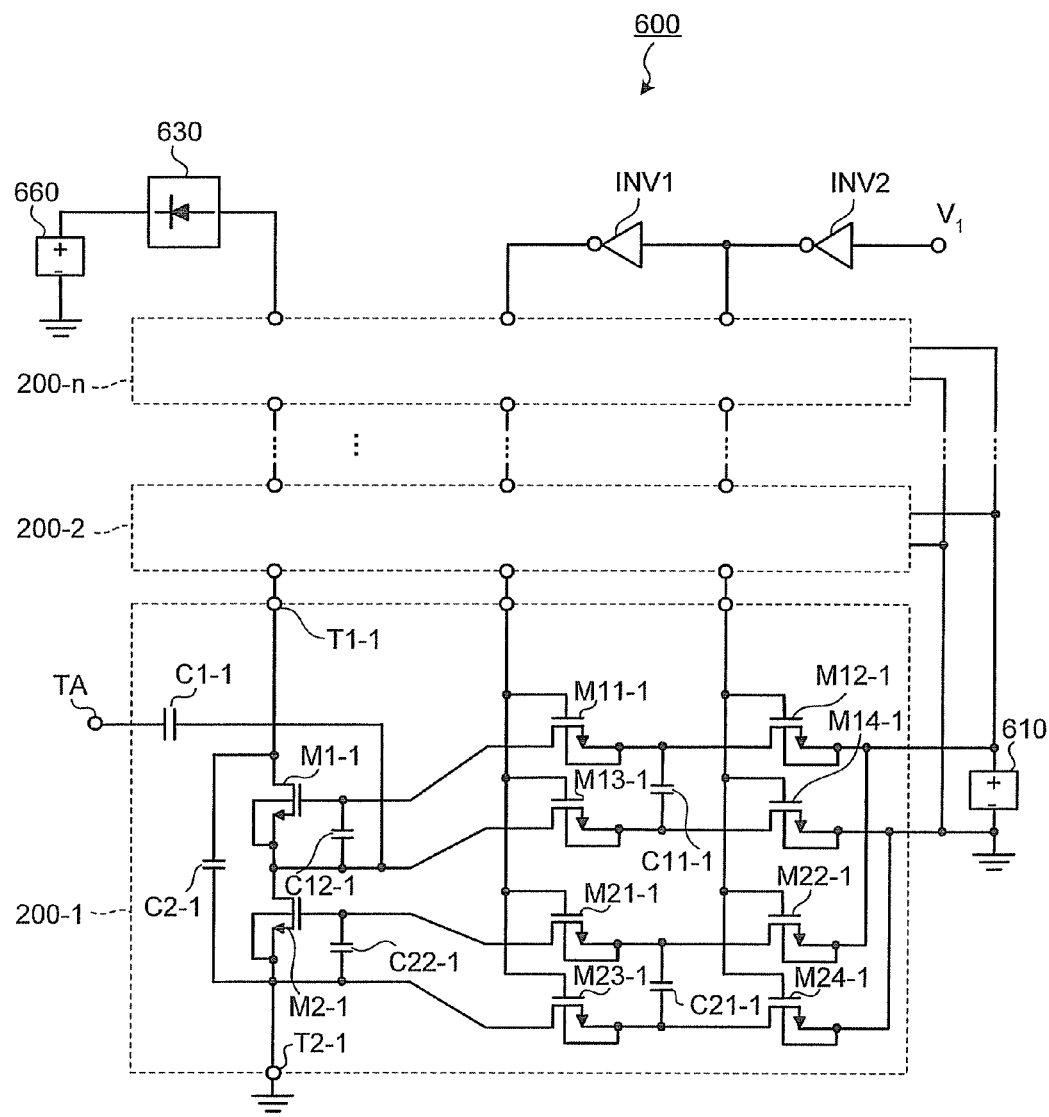
FIG. 10 is a circuit diagram of a cascade rectifier circuit of a rectifier circuit according to a third embodiment.

A rectifier circuit according to a third embodiment includes a plurality of rectifier circuits each corresponding to that in the first embodiment or the second embodiment, these rectifier circuits being cascade-connected. The rectifier circuit, in particular, is for eliminating the disadvantages of the cascade connection of the rectifier circuits. To begin with, the disadvantages will be explained below. Here, the rectifier circuit 200 in the first embodiment is taken as one of the rectifier circuits (hereinafter, referred to as "cascade rectifier circuit") to be cascade-connected FIG. 10 is a circuit diagram of a cascade rectifier circuit. A cascade rectifier circuit 600 shown in FIG. 10 includes n rectifier circuit stages 200-1 to 200-n that are cascade-connected, a bias voltage source 610, inverters INV1 and INV2, a backflow preventer circuit 630, and a battery 660. Each of the rectifier circuit stages 200-1 to 200-n includes the rectification circuit and eight NMOS transistors that function as transfer gates, out of the components of the rectifier circuit 200 shown in FIG. 1. The positive terminal of one rectifier circuit stage and the negative terminal of the other rectifier circuit, out of the adjacent rectifier circuit stages, are connected to each other, and the transfer gates share two signal lines connected to the gates.

FIG. 10 shows a detailed circuitry of only a rectifier circuit stage 200-1 that is the end of the rectifier circuit stages 200-1 to 200-n. NMOS transistors M1-1, M2-1, M11-1 to M14-1, and M21-1 to M24-1, and capacitors C1-1, C2-1, C11-1, C12-1, C21-1, and C22-1 correspond to the NMOS transistors M1, M2, M11 to M14, and M21 to M24, and the capacitors C1, C2, C11, C12, C21, and C22, respectively. The inverters INV1 and INV2 also are shared with the rectifier circuit stages 200-1 to 200-n, and function like the inverters INV1 and INV2 shown in FIG. 1.

The battery 660 is a power supply where a power-supply voltage $V_{DD}$ is generated, and let it be a secondary cell here. E>> This battery 660 is connected to the positive terminal of the rectification circuit in the highest rectifier circuit stage 200-n through the backflow preventer circuit 630. Hence, The voltage rectified by the rectifier circuit stages 200-1 to 200-n is stored in the battery 660. The backflow preventer circuit 630 is for example a diode whose cathode is connected to the battery 660.

As shown in FIG. 10, since the NMOS transistors that constitute each rectification circuit in the rectifier circuit stages 200-1 to 200-n are connected in series in a line from the battery 660 to the ground, leakage current caused in each of the rectifier circuit stages is the same. In other words, there is no deference in the leakage current caused in the rectification stages among the rectifier circuit stages 200-1 to 200-n. Therefore, the leakage current in the rectification circuit caused in the cascade rectifier circuit 600 can be imitated accurately by the bias setting circuit 100 shown in FIG. 1.

Next, focus on the lowest rectifier circuit stages 200-1 in the cascade rectifier circuit 600. The NMOS transistors M11-1, M13-1, M21-1, and M23-1 are OFF if the voltage across each of the capacitors C12-1 and C22-1 is equal to the bias voltage $V_T$ supplied from the bias voltage source 610. In this situation, when a weak AC signal is input to a connecting point between the NMOS transistors M1-1 and M2-1 in the rectification circuit, the connecting point shows almost the same potential as that at the source of the NMOS transistor M2-1, i.e., almost the ground potential. Therefore, the potential at the gate of the NMOS transistor M1-1 is the same as the voltage $V_T$ across the capacitor C12-1.

Since the gate of the NMOS transistor M1-1 is connected to the drain of the NMOS transistor M11-1, which is a transfer gate, the drain of the NMOS transistor M11-1 shows the potential $V_T$. The source of the NMOS transistor M11-1 shows a potential at the positive terminal of the bias voltage source 610 through the NMOS transistor 12-1, which is turned ON by complementary operation with the NMOS transistor 12-1, i.e., the bias voltage VT. Therefore, no potential difference occurs between the source and drain of the NMOS transistor M11-1, and the leakage current of the NMOS transistor M11-1 is vanishingly small.

In the same situation, the voltage between the source and drain of respective NMOS transistors M13-1, M21-1, and M23-1 is almost zero, and the leakage current of these NMOS transistors is vanishingly small. The same is true of the rectifier circuit stage 200-n.

Figure 11:
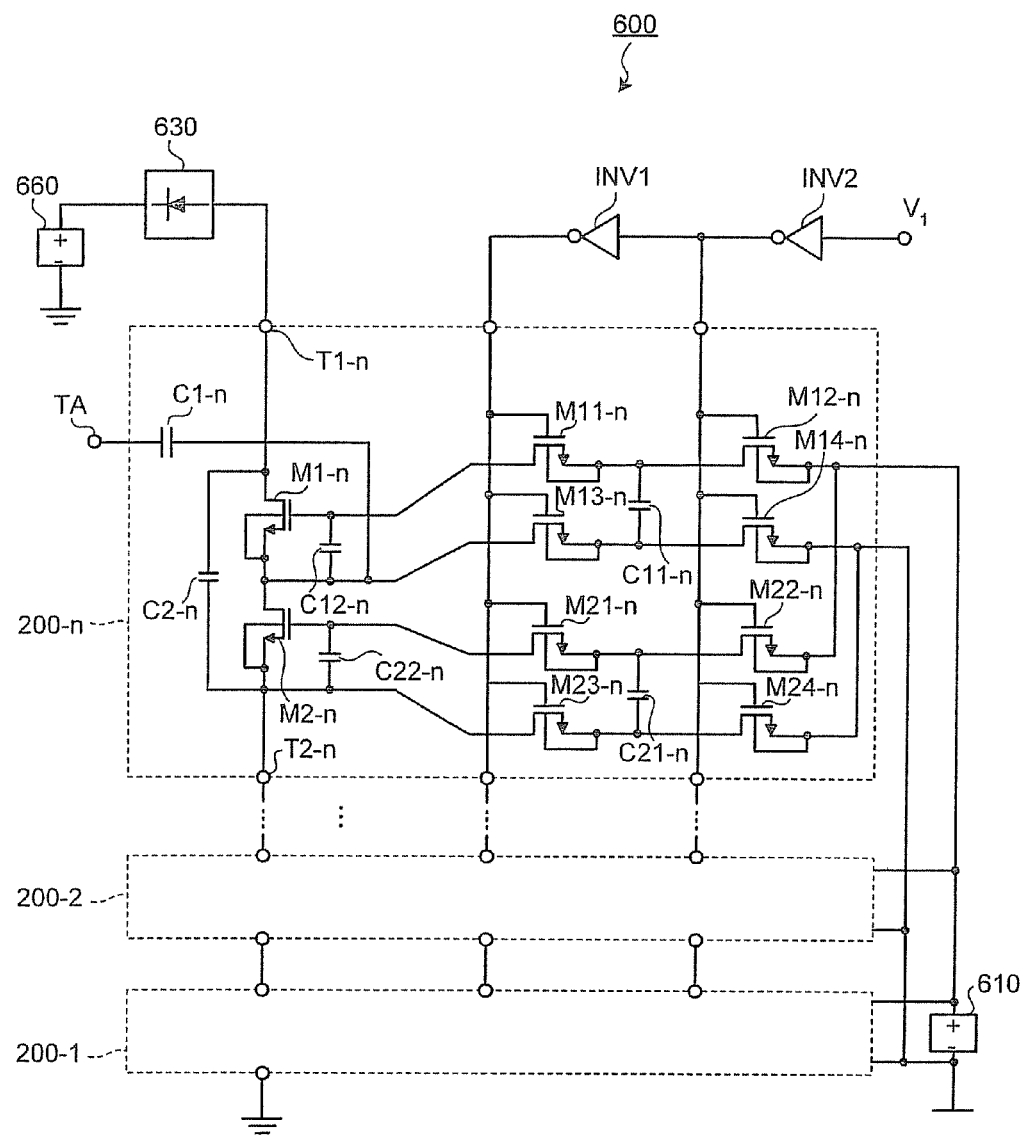
FIG. 11 is a detailed circuit diagram of a first rectifier circuit stage of the cascade rectifier circuit in FIG. 10.

Next, focus the state of the highest rectifier circuit stage when a high power signal is input and charges the bias voltage source 610. FIG. 11 shows the same cascade rectifier circuit 600 as that in FIG. 10 but a detailed circuitry of the highest rectifier circuit stage 200-n, out of the rectifier circuit stages 200-1 to 200-n. NMOS transistors M1-n, M2-n, M11-n to M14-n, and M21-n to M24-n, capacitors C1-n, C2-n, C11-n, C12-n, C21-n, and C22-n in FIG. 11 correspond to the NMOS transistors M1, M2, M11 to M14, and M21 to M24, and the capacitors C1, C2, C11, C12, C21, and C22 in FIG. 1, respectively.

The NMOS transistors M11-n, M13-n, M21-n, and M23-n are OFF if the voltage across each of the capacitors C12-n and C22-n is equal to the bias voltage $V_T$ supplied from the bias voltage source 610. In this situation, when a high power signal, which is able to charge the bias voltage source 610, is input to the signal input terminal TA, i.e., a connecting point between the NMOS transistors M1-n and M2-n in the rectification circuit, the connecting point shows almost the same potential as the sum of the voltages across of the smoothing capacitors C2-1 to C2-(n−1) in the rectifier circuit stages 200-1 to 200-(n−1). Since the voltage across the input and output terminals of the backflow preventer circuit 630 is few, the potential at the connecting point is almost the power supply voltage VDD for charging the battery 660. Therefore, the potential at the gate of the NMOS transistor M1-n shows $V_T+V_{DD}$ calculated by adding the power supply voltage $V_{DD}$ to the voltage VT across the capacitor C12-n.

Since the gate of the NMOS transistor M1-n is connected to the drain of the NMOS transistor M11-n, which is a transfer gate, the drain of the NMOS transistor M11-n shows the potential $V_T+V_{DD}$. The source of the NMOS transistor M11-n shows the same potential as that at the positive terminal of the bias voltage source 610, i.e., the bias voltage $V_T$, through the NMOS transistor 12-n, which is turned ON by the complementary operation with the NMOS transistor M11-n. Therefore, the potential difference $V_{DD}$ causes between the source and drain of the NMOS transistor M11-n. The potential difference $V_{DD}$ causes the charges in the capacitor C12-n to move to the capacitor C11-n. In the same situation, the voltage between the source and drain of the NMOS transistor M13-n is also almost $V_{DD}$, and thus leakage current flows therethrough. Therefore, the capacitor C12-n connected to the NMOS transistor M1-n in the rectification circuit is discharged with the leakage current of the NMOS transistor M11-n, which is a transfer gate. For similar reasons, the capacitor C22-n connected to the NMOS transistor M2-n in the rectification circuit is discharged with the leakage current of the NMOS transistor M21-n, which is a transfer gate.

However, the bias setting circuit 100 shown in FIG. 1 does not imitate the generation of leakage current of these transfer gates. In other words, the bias setting circuit 100 cannot accurately monitor the state of potential of the capacitor in the rectification circuit of the cascade rectifier circuit 600 shown in FIG. 10. The rectifier circuit according to the third embodiment can eliminate this disadvantages.

Figure 12:
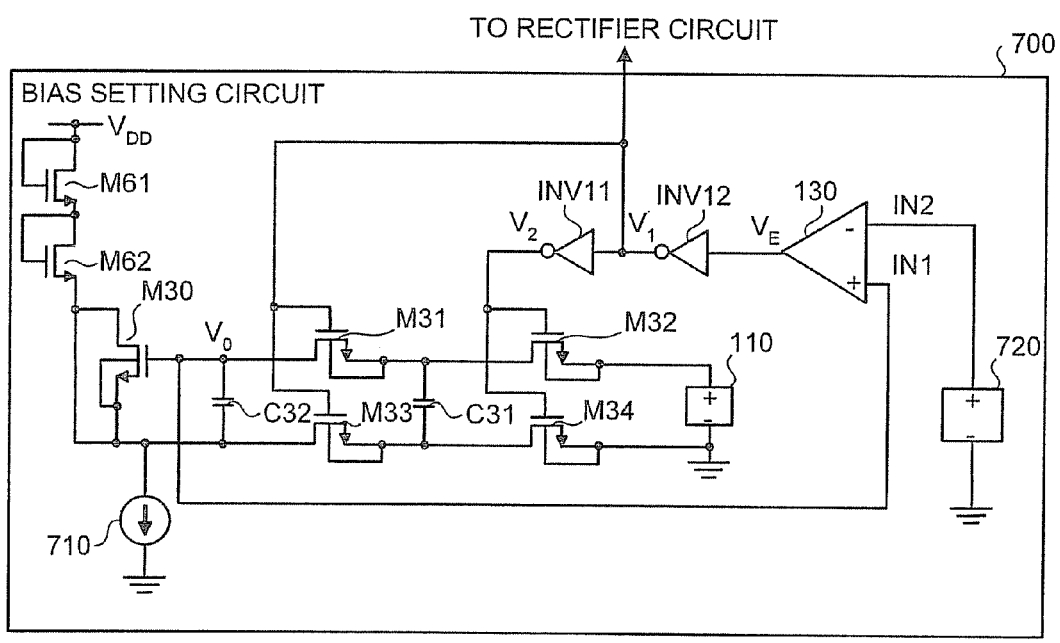
FIG. 12 is a circuit diagram of a bias setting circuit constituting the rectifier circuit according to the third embodiment.

FIG. 12 is a circuit diagram of a bias setting circuit of the rectifier circuit according to the third embodiment. In FIG. 12, the same components as those in the bias setting circuit 100 of FIG. 1 are labeled by the same reference characters, and therefore, the components is not explained here.

The bias setting circuit 700 shown in FIG. 12 differs from the bias setting circuit 100 of FIG. 1 in that (i) two NMOS transistors M61 and M62 and a current source 710 are provided, (ii) a reference voltage source 720 connected to the inverting input terminal IN2 of the differential amplifier 130 generates a reference voltage $V_{DD}-V_T-V_X$, and (iii) the drain and source of the NMOS transistor M30 in the dummy rectification circuit is not grounded.

Each of the NMOS transistors M61 and M62 has a gate and a drain which are connected to each other, and functions as a load element. Referring to FIG. 12, the source of the NMOS transistor M61 and the drain of the NMOS transistor M62 are connected to each other. The drain of the NMOS transistor M61 is connected to a power supply line $V_{DD}$, and the source of the NMOS transistor M62 is connected to the drain and source of the NMOS transistor M30. The current source 710 is connected to the drain and source of the NMOS transistor M30. In this circuitry, the NMOS transistors M61 and M62 causes almost the same voltage drop as the sum of the threshold voltages of the NMOS transistors M61 and M62 between the power supply line and the NMOS transistor M30 with weak current supplied from the current source 710. Each of the NMOS transistors M61 and M62 has a threshold voltage equal to the bias voltage $V_T$ generated by the bias voltage sources 110 and 210. Therefore, a potential $V_{DD}-2V_T$ is applied to the drain and source of the NMOS transistor M30. A general bias circuit may be used as the current source 710, or be composed of a transistor whose gate-to-source voltage is set to 0 V for using leakage current thereof.

In the state where the voltage across the capacitor C32 is equal to the bias voltage $V_T$, the drain of the NMOS transistor M31, which is a transfer gate, shows a potential $V_{DD}-V_T$ calculated by adding the bias voltage $V_T$ to a potential $V_{DD}-2V_T$ at the drain and source of the NMOS transistor M30. The source of the NMOS transistor M31 shows the same potential as that at the positive terminal of the bias voltage source 110, i.e., the bias voltage $V_T$, through the NMOS transistor M32, which is turned ON by the complementary operation with the NMOS transistor M31. Therefore, the potential difference $V_{DD}-2V_T$ occurs between the source and drain of the NMOS transistor M31. The potential difference $V_{DD}-2V_T$ causes the capacitor C32 to be discharged. In other words, the state of current leakage similar to that in the highest rectifier circuit stage 200-n shown in FIG. 11 is presented. However, the source-to-drain voltage $V_{DD}-2V_T$ of the NMOS transistor M31 is smaller than the source-to-drain voltage $V_{DD}$ of the NMOS transistor M11-n in the rectifier circuit stage 200-n by $2V_T$. Therefore, the state of current leakage of the cascade rectifier circuit 600 is not imitated accurately by the bias setting circuit 700. However, the difference of $2V_T$ can be disregarded by adjustment the scale of the NMOS transistor M31. In general, the leakage current of the NMOS transistor whose gate is grounded depends on the drain-to-source voltage ($V_{DS}$). The dependency is decided according to the process condition of the transistor. If the $V_{DS}$ dependence of the NMOS transistor M31 is small, the leakage current caused by $V_{DS}$ is small. If the $V_{DS}$ dependence of the NMOS transistor M31 is large, the leakage current changes by a factor of several depending on the differential voltage $2V_T$. In view of this, the scale of the NMOS transistors M31 and M33 is designed one to ten times as large as each transfer gate in the cascade rectifier circuit 600. As a result, the state of electric current leakage in the cascade rectifier circuit 600 can be imitated in the bias setting circuit 700.

The operation of the bias setting circuit 700 follows the timing chart shown in FIG. 4, except that the reference voltage to be compared with the potential $V_0$ of the capacitor C32 is $V_{DD}-V_T-V_X$, and is thus not explained here.

There is a possibility that leakage current occurs in the transfer gates in the rectifier circuit stages 200-2 to 200-(n-1) other than the highest rectifier circuit stage 200-n. However, the most leakage current occurs in the highest rectifier circuit stage 200-n. Consequently, it is effective for the bias setting circuit 700 to imitate the generation of the drain-to-source voltage $V_{DD}$ of the transfer gate in the highest rectifier current circuit.

As described above, in the rectifier circuit according to the third embodiment, the bias setting circuit 700 can imitate the state of current leakage of a transfer gate in the highest rectifier circuit stage 200-n of the cascade rectifier circuit 600. As a result, it is possible for the cascade rectifier circuit 600 to have the same advantages as that in the first embodiment.

Figure 13:
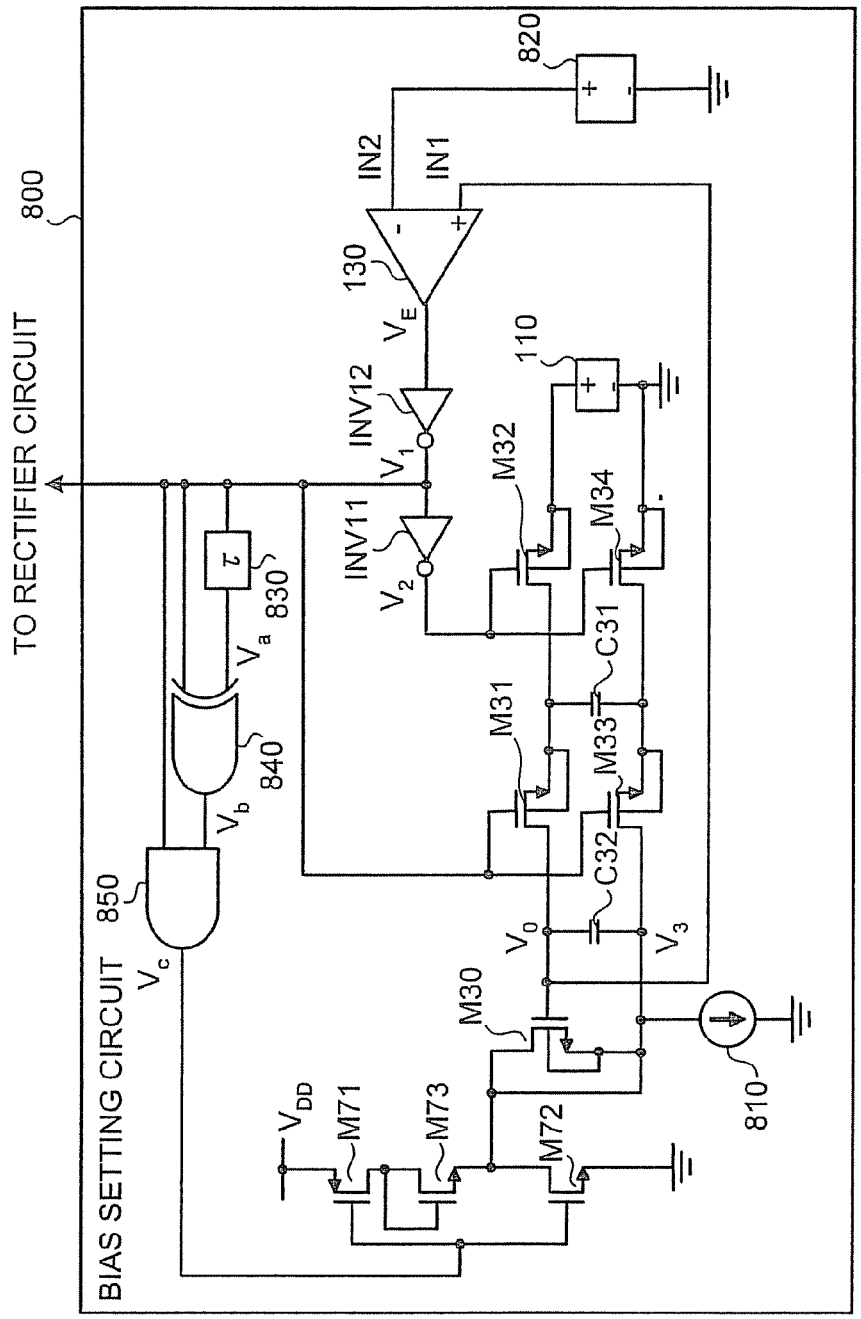
FIG. 13 is a circuit diagram of a bias setting circuit constituting a rectifier circuit according to a fourth embodiment.

A rectifier circuit according to a fourth embodiment includes a bias setting circuit for eliminating the disadvantages described in the third embodiment in another way. FIG. 13 is a circuit diagram of a bias setting circuit of the rectifier circuit according to the fourth embodiment. In FIG. 13, the same components as those in the bias setting circuit shown in FIG. 9 are labeled by the same reference characters, and therefore, the components is not explained here.

The bias setting circuit 800 shown in FIG. 13 defers from the bias setting circuit 100 shown in FIG. 1 in that (i) a PMOS transistor M71, and NMOS transistors M73 and M72, which are connected in series, a current source 810, a delay circuit 830, an EXOR circuit 840, and an AND circuit 850, (ii) a reference voltage source 820 connected to the inverting input terminal IN2 of the differential amplifier 130 generates a reference voltage $V_{DD}-V_X$, and (iii) the drain and source of the NMOS transistor M30 in the dummy rectification circuit is not grounded.

The combination of the PMOS transistor M71 and the NMOS transistor M72 functions as a CMOS inverter. Referring to FIG. 13, the source of the PMOS transistor M71 is connected to a power supply line $V_{DD}$, and the source of the NMOS transistor M72 is connected to the ground. The gate and drain of the NMOS transistor M73 are both connected to the drain of the PMOS transistor M71, and the source of the NMOS transistor M73 is connected to the drain of the NMOS transistor M72. A connecting point between the NMOS transistors M72 and M73 is connected to the drain and source of the NMOS transistor M30 in the dummy rectification circuit, and functions as an output node of the CMOS inverter. The gate of the PMOS transistor M71 and the gate of the NMOS transistor M72 are connected to each other, and functions as an input node of the CMOS inverter.

The input node of the CMOS inverter is connected to the output terminal of the AND circuit 850 (a signal $V_c$ is output), and the AND circuit 850 receives the output (i.e., the control signal $V_1$) of the inverter INV12 and the output (a signal $V_b$) of the EXOR circuit 840. The EXOR circuit 840 receives the output of the inverter INV12 and the output (a signal $V_a$) of the delay circuit 830. The delay circuit 830 delays the output of the inverter INV12 by a time $\tau$, thereby outputting the signal $V_a$.

Figure 14:
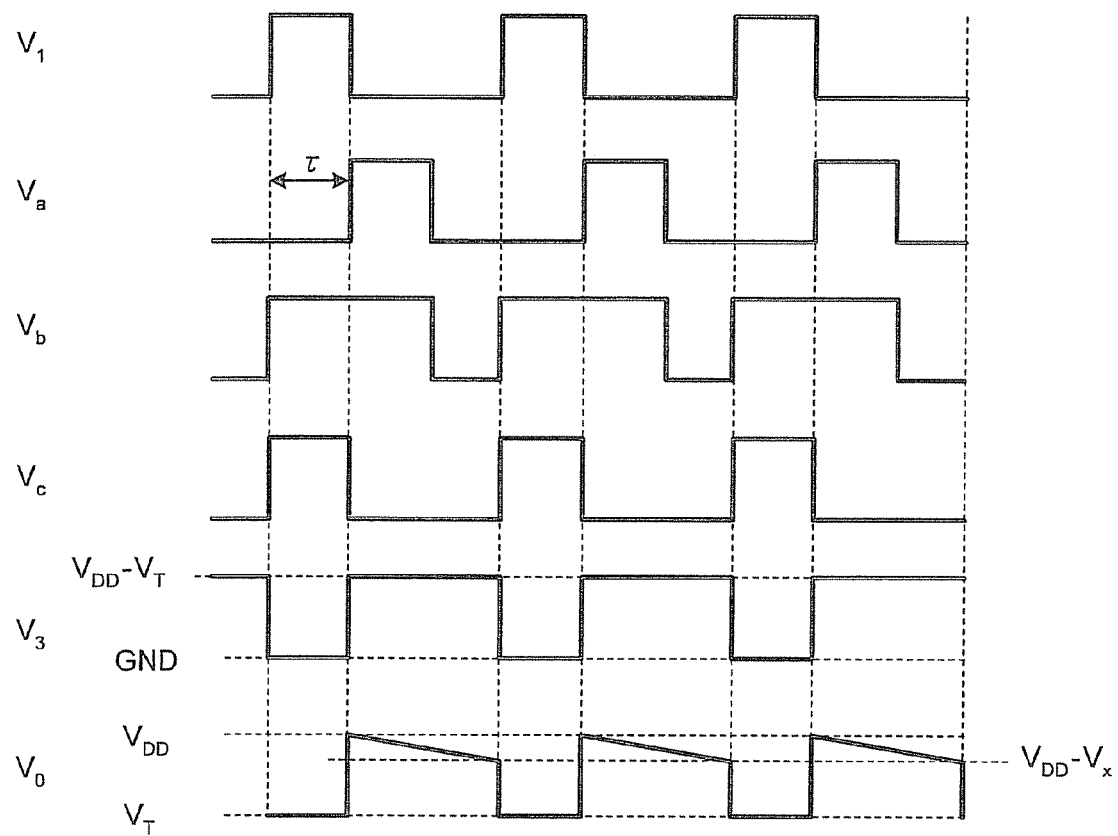
FIG. 14 is a timing chart of the bias setting circuit of the rectifier circuit according to a fourth embodiment.

The operation of the bias setting circuit 800 will be described below. FIG. 14 is a timing chart of the control signal $V_1$ output from the inverter INV12, the signal $V_a$ output from the delay circuit 830, the signal $V_b$ output from the EXOR circuit 840, and the signal $V_c$ output from the AND circuit 850, the potential $V_0$ at one end of the capacitor C32, and a potential $V_3$ at the other end of the capacitor C32.

Suppose an initial state immediately after the control signal $V_1$ enters a logic "high" from a logic "low". In this state, the delay circuit 830 starts counting the time $\tau$. The output signal $V_a$ is a logic "low" until the time $\tau$ elapses. Accordingly, as shown in FIG. 14, the signals $V_b$ and $V_c$ are both logic "high" until the time $\tau$ elapses after the control signal V1 enters a logic "high" from a logic "low". Therefore, a signal of logic "high" is input to the gates of the PMOS transistor M71 and the NMOS transistor M72, and the invert of the signal, a signal of logic "low" is output from a connecting point between the NMOS transistor M72 and the PMOS transistor M73. Since this signal of logic "low" is almost 0 V (ground potential), the potential V3 at the other end of the capacitor C32 is the ground potential. Meanwhile, the potential $V_0$ at one end of the capacitor C32 is equal to a level higher than the potential $V_3$ by the bias voltage $V_T$, i.e., the potential $V_T$.

The time $\tau$ is at least a time required to have transferred charges from the capacitor C31 to the capacitor C32 through the NMOS transistors M31 and M33. When the time $\tau$ elapses, the output signal $V_a$ of the delay circuit 830 is a logic "high". The signal $V_b$ remains at a logic "high" but the signal $V_c$ is a logic "low". A signal of logic "low" is input to the gates of the PMOS transistor M71 and the NMOS transistor M72, the invert of the signal, a signal of logic "high" is output from a connecting point between the NMOS transistors M72 and M73. This signal of logic "high" accurately shows a potential $V_{DD}-V_T$ calculated by subtracting the threshold voltage $V_T$ of the NMOS transistor M73 from the power supply voltage $V_{DD}$. Specifically, the potential $V_3$ of the other end of the capacitor C32 also shows $V_{DD}-V_T$. Meanwhile, the potential $V_0$ at one end of the capacitor C32 is equal to a level higher than the potential $V_3$ by the bias voltage $V_T$, i.e., the potential $V_{DD}$. The differential amplifier 130 outputs a differential voltage $V_X$ between the potential $V_{DD}$ and the reference voltage $V_{DD}-V_X$. This differential voltage $V_X$ is accepted by the inverter INV12 as a logic "high" as in the timing chart shown in FIG. 4, so that the control signal $V_1$ changes from a logic "high" to a logic "low". The control signal $V_1$ of logic "low" turns OFF the NMOS transistors M31 and M33, and turns ON the NMOS transistors M32 and M34 through the inverter INV11. In this state, since the potential $V_0$ is equal to the power supply voltage $V_{DD}$, the drain-to-source voltage of the NMOS transistor M31 becomes $V_{DD}-V_T$, so that the state of current leakage of the NMOS transistor M31 occurs. The potential $V_0$ of the capacitor C32 decreases gradually due to the leakage current and finally becomes smaller than the reference voltage $V_{DD}-V_X$. Specifically, the differential voltage $V_E$ output from the differential amplifier 130 becomes an input signal of logic "low" for the inverter INV12. As a result, the control signal $V_1$ shows a logic "high" again as in the initial state. After that, the phases are repeated.

Consequently, the state of the capacitor in the rectification circuit of the rectifier circuit can be observed as the first embodiment. In particular, according to the fourth embodiment, the drain-to-source voltage $V_{DD}-V_X$ causes the state of current leakage due to the NMOS transistor M31. This voltage is closer to $V_{DD}$ by the voltage $V_X$ than the drain-to-source voltage $V_{DD}-2V_X$ described in the third embodiment. In other words, this is a value closer to the drain-to-source voltage $V_{DD}$, which causes the leakage current in the highest rectifier circuit stage in the cascade rectifier circuit, and it is therefore possible to imitate the state of current leakage in the cascade rectifier circuit 600 more accurately than the bias setting circuit 700 of the third embodiment.

Figure 15:
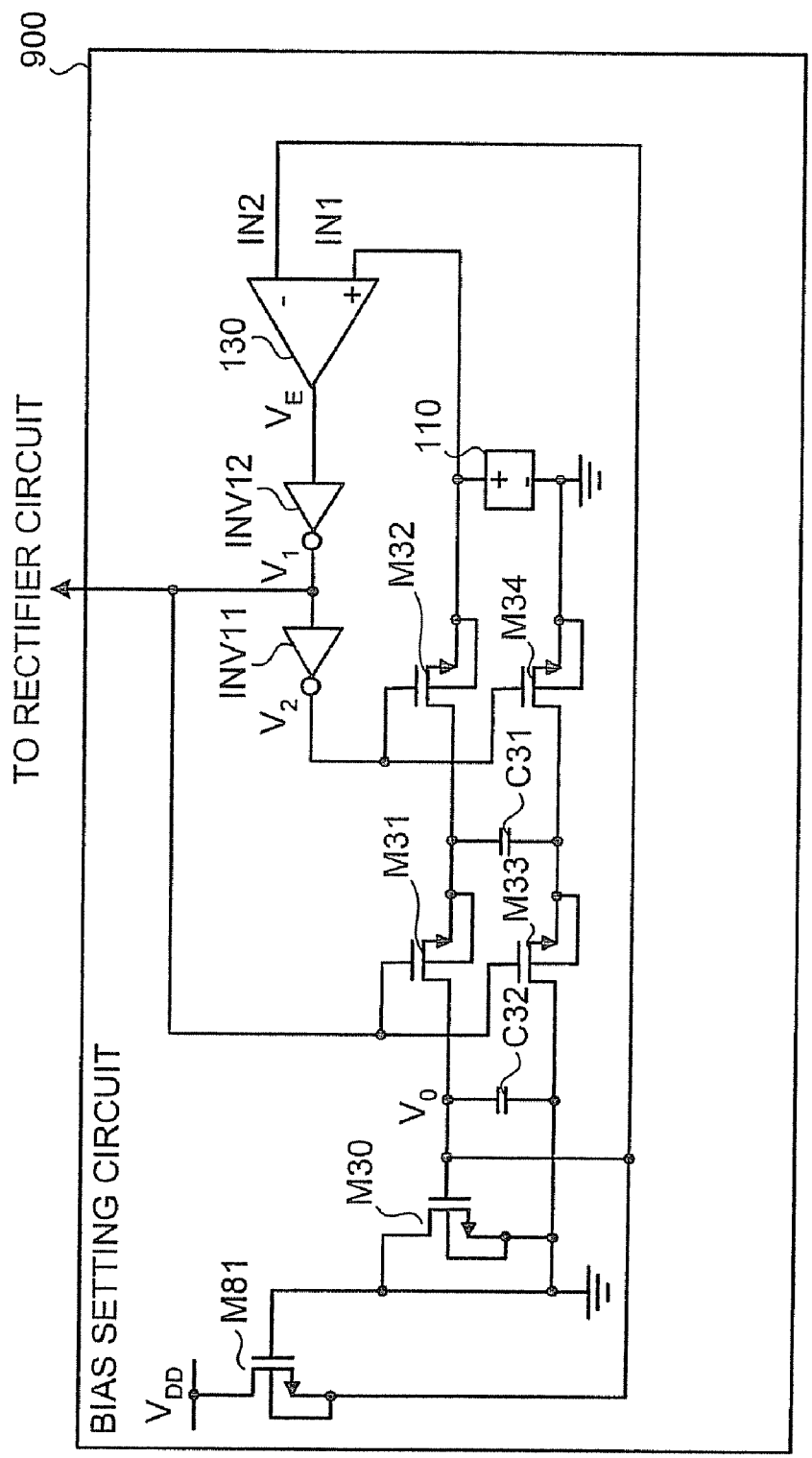
FIG. 15 is a circuit diagram of a bias setting circuit constituting a rectifier circuit according to a fifth embodiment.

A rectifier circuit according to a fifth embodiment includes a bias setting circuit for eliminating the disadvantages described in the third embodiment in still another way. FIG. 15 is a circuit diagram of a bias setting circuit of a rectifier circuit according to a fifth embodiment. In FIG. 15, the same components as those in the bias setting circuit 100 shown in FIG. 1 are labeled by the same reference characters, and therefore, the components is not explained here.

The bias setting circuit 900 differs from the bias setting circuit 100 shown in FIG. 1 in that (i) an NMOS transistor M81 is provided, (ii) one end of the capacitor C32 (potential $V_0$) is connected to the inverting input terminal IN2 of the differential amplifier 130, (iii) the positive terminal of the bias voltage source 110 is connected to the non-inverting input terminal IN1 of the differential amplifier 130, and (iv) no reference voltage source 120 is provided.

The drain of the NMOS transistor M81 is connected to a power supply line (power supply voltage $V_{DD}$), the source of the NMOS transistor M81 is connected to one end of the capacitor C32 (potential $V_0$), and the gate of the NMOS transistor M81 is connected to the drain and source of the NMOS transistor M30.

In this circuitry, the NMOS transistor M81 is always OFF because the gate is grounded, and the drain-to-source voltage shows $V_{DD}-V_T$ calculated by subtracting the threshold voltage VT from the power supply voltage VDD. This means leakage current of the NMOS transistor M81 caused by the drain-to-source voltage $V_{DD}-V_T$ is supplied to one end (potential $V_0$) of the capacitor C32 during a time period when the NMOS transistors M31 and M33 are OFF. In other words, the drain-to-source voltage $V_{DD}-V_T$ of the NMOS transistor M31 described in the fourth embodiment is generated with the NMOS transistor M81. However, the leakage current does not induce discharging the capacitor C32 but rising the potential $V_0$ at one end of the capacitor C32. In view of this, the differential amplifier 130 detects an increase in the potential $V_0$ by the acceptance of the voltage $V_T$ of the bias voltage source 110 at the non-inverting input terminal IN1. Concretely, for example, the logical level of the differential voltage $V_E$ reverses when the potential $V_0$ showing the bias voltage $V_T$ increases by more than the voltage $V_X$, that is, when the potential $V_0$ becomes higher than $V_{DD}-V_T$. The operation of the bias setting circuit 900 follows the timing chart shown in FIG. 4 otherwise, and is thus not explained here. The voltage $V_X$ is obtained by adjustment of the scale of the NMOS transistors M123 and M124 in FIG. 2.

As described above, in the rectifier circuit according to the fifth embodiment, the bias setting circuit 900 can imitate the state of current leakage of a transfer gate in the highest rectifier circuit stage 200-n of the cascade rectifier circuit 600. As a result, it is possible for the cascade rectifier circuit 900 to have the same advantages as that in the first embodiment.

Figure 16:
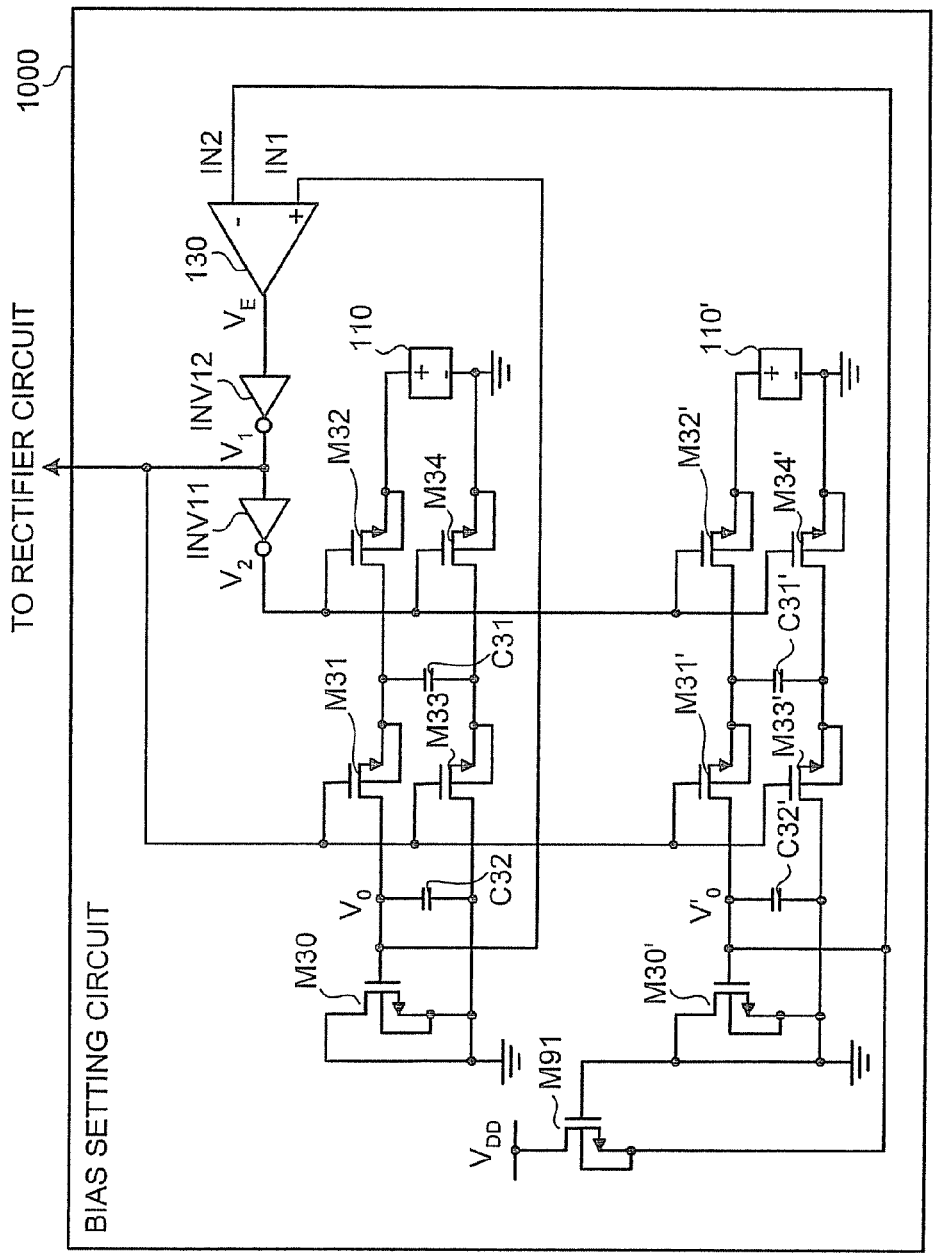
FIG. 16 is a circuit diagram of a bias setting circuit constituting a rectifier circuit according to a sixth embodiment.

A rectifier circuit according to a sixth embodiment is a modification to the rectifier circuit according to the fifth embodiment. FIG. 16 is a circuit diagram of a bias setting circuit of the rectifier circuit according to the sixth embodiment. In FIG. 16, the same components as those in the bias setting circuit 100 shown in FIG. 9 are labeled by the same reference characters, and therefore, the components is not explained here.

The bias setting circuit 1000 shown in FIG. 16 differs from the bias setting circuit 100 shown in FIG. 1 in that a second dummy rectification circuit and a second dummy switching circuit are added. Hereafter, the dummy rectification circuit and the dummy switching circuit corresponding to those in FIG. 1 are referred to as "a first dummy rectification circuit" and "a first dummy switching circuit", respectively. The bias setting circuit 1000 includes an NMOS transistor M30' and a capacitor C32' corresponding to the NMOS transistor M30 and the capacitor C32 in the first dummy rectification circuit, respectively. The NMOS transistor M30' and the capacitor C32' constitute the second dummy rectification circuit. The bias setting circuit 1000 also includes NMOS transistors M31', M32', M33', and M34', a capacitor C31', and a bias voltage source 110' corresponding to the NMOS transistors M31, M32, M33, and M34, the capacitor C31, and the bias voltage source 110 in the first dummy rectification circuit, respectively. The NMOS transistors M31' to M34', the capacitor C31', and the bias voltage source 110' constitute the second dummy switching circuit. The bias setting circuit 1000 further differs from the bias setting circuit 100 in that (i) an NMOS transistor M91 is provided, (ii) one end (potential $V_0'$) of the capacitor C32' is connected to the inverting input terminal of the differential amplifier 130, and (iii) no reference voltage source 120 is provided.

The drain of the NMOS transistor M91 is connected to a power supply line (power-supply voltage $V_{DD}$), and the source of the NMOS transistor M91 is connected to one end (potential V0') of the capacitor C32', and the gate of the NMOS transistor M91 is connected to the drain and source of the NMOS transistor M30'.

The bias setting circuit 1000, in other words, has a circuitry where the non-inverting input terminal IN1 of the differential amplifier 130 is connected to one end (potential $V_0$) of the capacitor C32 in the first dummy rectification circuit instead of the positive terminal of the bias voltage source 110 in FIG. 15.

As a result, the operation of the bias setting circuit 1000 is almost the same as that of the bias setting circuit 900 described in the fifth embodiment. The bias setting circuit 1000, however, has an advantage that a differential voltage due to leakage current of the capacitor C32' can be detected more accurately because the reference voltage input to the non-inverting input terminal of the differential amplifier 130 is not the bias voltage $V_T$ but the present potential of the capacitor C32 in the rectification circuit.

The rectifier circuit according to any one of the first to sixth embodiments can be used as a rectifier circuit for an RFID tag.

Figure 17:
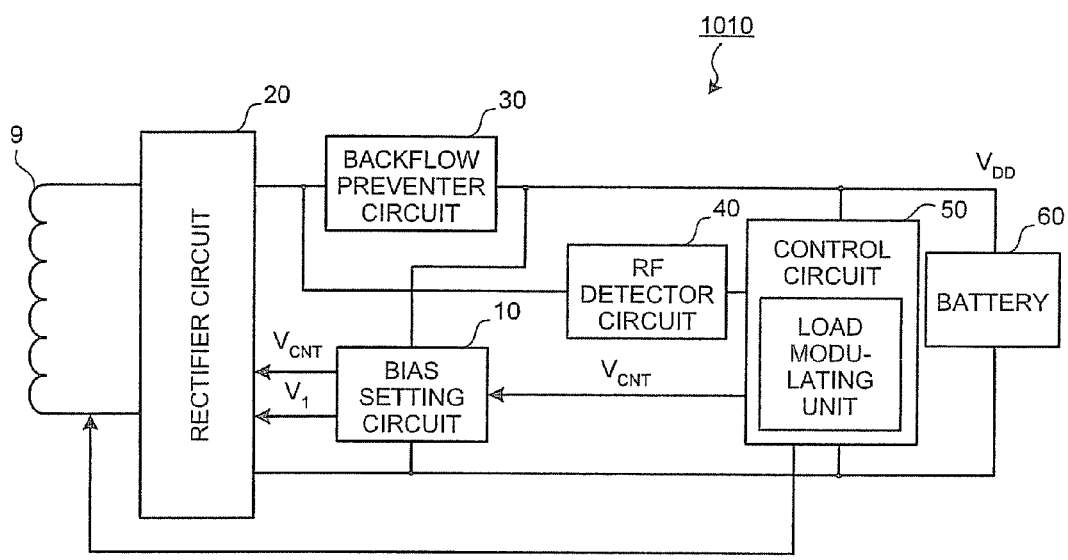
FIG. 17 is a block diagram of an RFID tag according to a seventh embodiment.

A seventh embodiment is to describe an RFID tag using the rectifier circuit according to the second embodiment. FIG. 17 is a circuit diagram of the RFID tag according to the seventh embodiment. An RFID tag 1010 shown in FIG. 17 includes an antenna 9, a bias setting circuit 10 as shown in FIG. 5, a rectifier circuit 20 as shown in FIG. 7, a backflow preventer circuit 30, an RF detector circuit 40, a control circuit 50, and a battery 60 that is a secondary cell. Here, the bias setting circuit 10 and the rectifier circuit 20 constitute the rectifier circuit according to the second embodiment. This RFID tag 1010 is operated by a power supply voltage VDD supplied from the battery 60, and it is not always necessary to generate a power supply voltage from the rectifier circuit 20 for its operation. Specifically, the bias setting circuit 10, the rectifier circuit 20, the backflow preventer circuit 30, the RF detector circuit 40, and the control circuit 50 are all connected to a power supply line and a ground line which extend from the battery 60. In this embodiment, suppose that the reset signal VCNT is not generated by the power detector circuit shown in FIG. 8 but by the control circuit 50.

The antenna 9 induces an alternating current in its antenna line according to magnetic flux variation generated by a reader and writer (not shown in the figure). This alternating current is input to the signal input terminal of the rectifier circuit 20. The rectifier circuit 20 operates at the power supply voltage supplied from the battery 60. Therefore, the bias voltage source or the reference voltage source as shown in FIGS. 3A to 3D generates the bias voltage $V_T$ or the reference voltage $V_T$–$V_X$ from the power supply voltage $V_{DD}$ supplied from the battery 60. Specifically, the bias voltage $V_T$ is applied between the gate and source of the MOS transistors constituting the rectification circuit in the rectifier circuit 20, regardless of whether an alternating current is supplied from the antenna 9. Therefore, the rectifier circuit 20 can rectify a weak alternating current induced in the antenna 9 with a root-mean-square value of less than approximately 0.7 V, as described in the first and second embodiments. In other words, it is possible to demodulate the weak data signal received by the antenna 9. For rectification, the control signal $V_1$ is input from the bias setting circuit 10 to the rectifier circuit 20 at the perfect time, and the rectifier circuit 20 maintains the bias voltage of the MOS transistor constituting the rectification circuit at more than a predetermined value based on the control signal $V_1$.

The demodulated data signal is transmitted to the RF detector circuit 40. The RF detector circuit 40 detects the data signal to drive the control circuit 50 and to output the detected data signal to the control circuit 50. A DC voltage obtained by the rectifier circuit 20 is supplied to the battery 60 as an electric power for charge through the backflow preventer circuit 30.

The control circuit 50 reads out data stored in a memory (not shown in the figure) based on the data signal received from the rectifier circuit 20 and writes data in the memory. The stored data is, for example, tag identification information. The control circuit 50 includes a load modulating unit connected to the antenna 9. The data read out from the memory is transmitted to the reader and writer by modulating current flowing in the antenna 9 with the load modulating unit. Concretely, the load modulation unit generates a demagnetizing field in the antenna 9. The demagnetizing field makes a slight change in the current that flows in the reader and writer's antenna. This slight change is detected by the reader and writer, and identified as a data signal.

Figure 18:
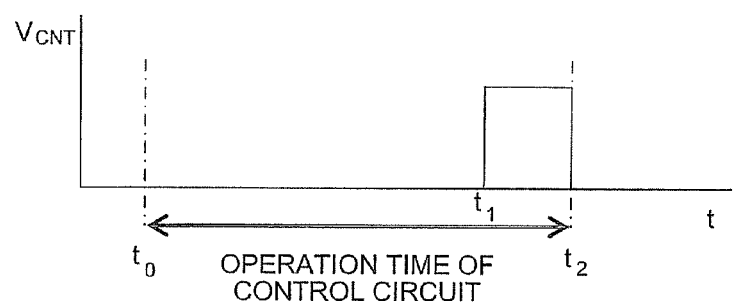
FIG. 18 is a timing chart of a reset signal.

Moreover, the control circuit 50 generates the reset signal $V_{CNT}$ input to the bias setting circuit 10 and the rectifier circuit 20. FIG. 18 is a timing chart of the reset signal $V_{CNT}$. As shown in FIG. 18, the control circuit 50 outputs a pulse of the reset signal $V_{CNT}$ immediately before entering suspend stage from running state (time $t_1$) so that the bias setting circuit 10 and the rectifier circuit 20 are initialized. The reset signal $V_{CNT}$ is not generated at the timing according to FIG. 18 because the control circuit 50 does not run yet when the battery 60 is first installed in the RFID tag after the RFID tag is manufactured. However, it is possible to run the control circuit 50 by transmitting a high power RF signal to the RFID tag on manufacturing test, so that the reset signal $V_{CNT}$ is generated. In other words, the circuitry composed of the bias setting circuit 10 and the rectifier circuit 20 does not run as a rectifier circuit but as a conventional low gain rectifier circuit before manufacturing test. Applying a high power RF signal makes the circuitry be a rectifier circuit.

Figure 19:
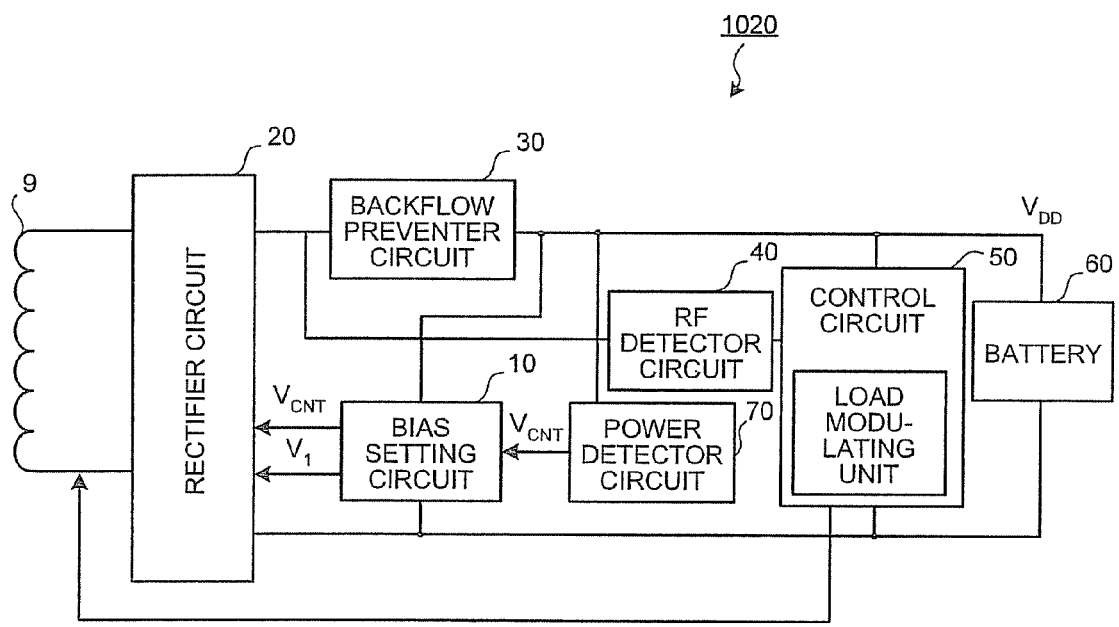
FIG. 19 is a block diagram of another RFID tag according to the seventh embodiment.

The reset signal $V_{CNT}$ may be generated by the power detector circuit shown in FIG. 8 instead of the control circuit 50. FIG. 19 is a block diagram of an RFID tag with a power detector circuit. In FIG. 19, the same components as those in the RFID tag shown in FIG. 17 are labeled by the same reference characters, and therefore, the components is not explained here. In the RFID tag 1020 tag shown in FIG. 19, a power detector circuit 70 as shown in FIG. 8 is installed, and the power detector circuit 70 generates the reset signal $V_{CNT}$ instead of the control circuit 50. As a result, even when the battery 60 is first installed in the RFID tag after the RFID tag is manufactured, the power detector circuit 70 detects that, so that the reset signal $V_{CNT}$ is generated.

Figure 20:
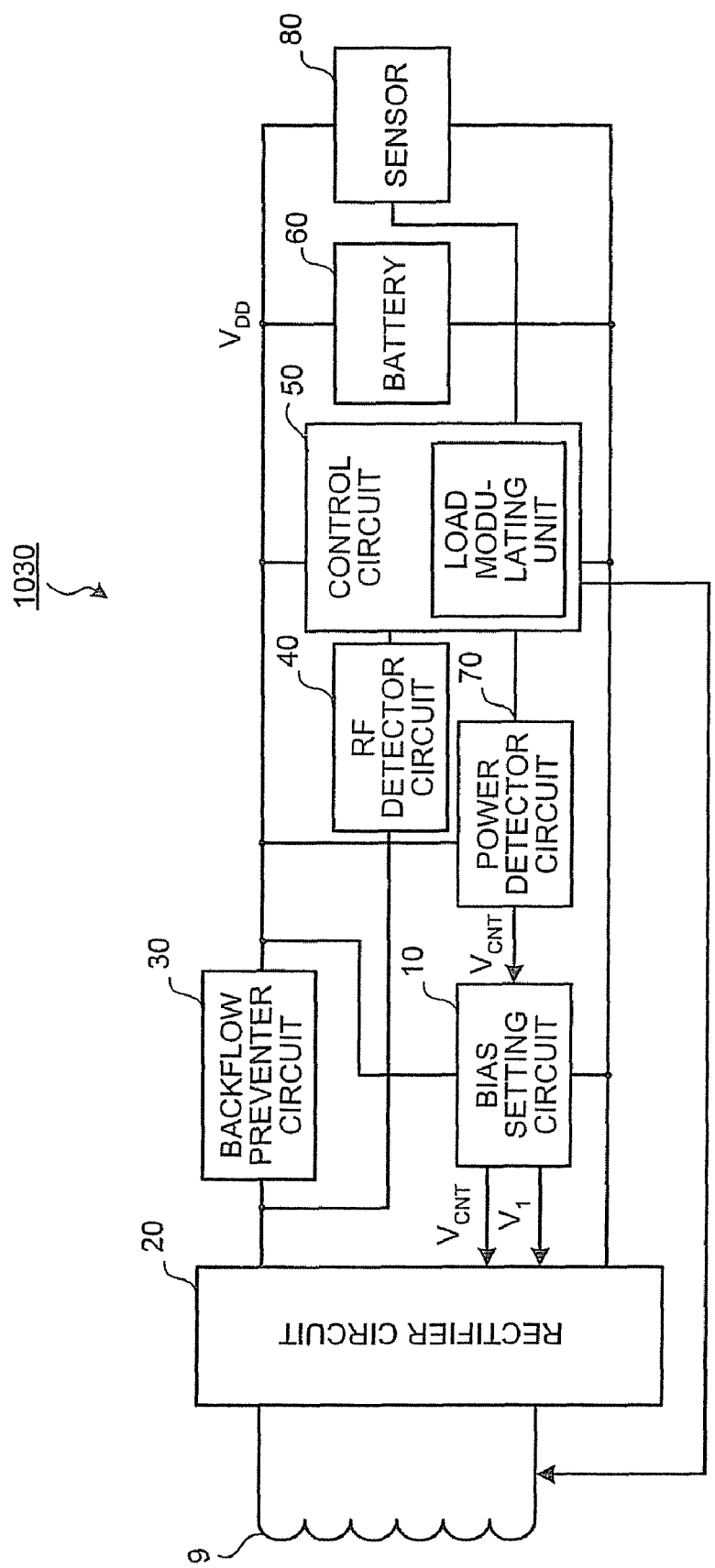
FIG. 20 is a block diagram of an RFID tag with a sensor according to the embodiments.

Moreover, since the RFID tag according to this embodiment includes the battery 60, it is easy to install various input-output devices, such as a temperature sensor, a speaker, a microphone, and a light emitting device, in the RFID tag. Such an RFID tag has a broader application. An RFID tag with a sensor has a structure shown in FIG. 20 for example. In FIG. 20, the same components as those in the RFID tag shown in FIG. 17 are labeled by the same reference characters, and therefore, the components is not explained here. In an RFID tag 1030 shown in FIG. 20, a sensor 80 is connected to a power supply line and a ground line which are extended from the battery 60. The control circuit 50 transmits and receives signals to and from the sensor 80. As an example of the sensor installed in the RFID tag, a temperature sensor will now be explained. The temperature sensor is in sleep and does not use power during no transmission of signal from a reader and writer (not shown in the figure). When the control circuit 50 sends a request to the RFID tag with the temperature sensor based on a signal transmitted by the reader and writer, the temperature sensor is activated to detect temperature and then to transmit temperature data to the control circuit 50. This temperature data and unique data of the RFID tag are transmitted from the RFID tag to the reader and writer. As another operation of the temperature sensor, the control circuit 50 may send a request for output of temperature data to the temperature sensor at given time intervals to store the temperature data in a memory (not shown in the figure). And, the control circuit 50, when receiving a request from the reader and writer, transmits the stored temperature data together with detection time data to the reader and writer. The temperature sensor may be activated by a trigger such as vibration, sound, and light to store the temperature data in the memory.

According to the RFID tag according to the seventh embodiment as described above, since the rectifier circuit according to the second embodiment is provided, it is possible to prevent overcharge for biasing the MOS transistors constituting the rectification circuit in the rectification circuit and thus to reduce power consumption.

Moreover, it is possible to provide a rectification gain more than a predetermined value without influence of manufacturing differences in the rectifier circuits.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rectifier circuit comprising:
   a first MOS transistor;
   a first capacitor configured to connect between a gate and a source of the first MOS transistor;
   a first switching circuit configured to supply a bias voltage to the first capacitor in response to a control signal;

a second MOS transistor whose drain is connected to the source of the first MOS transistor;

a second capacitor configured to connect between a gate and a source of the second MOS transistor;

a second switching circuit configured to supply the bias voltage to the second capacitor in response to the control signal;

a third MOS transistor configured to imitate the first MOS transistor;

a third capacitor configured to imitate the first capacitor;

a fourth capacitor connected between a drain of the first MOS transistor and the source of the second MOS transistor, a direct current being supplied through the fourth capacitor with respect to an alternating current supplied to the source of the first MOS transistor;

a dummy switching circuit configured to supply the bias voltage to the third capacitor in response to the control signal; and a generating circuit configured to generate the control signal based on a potential of the third capacitor.

2. The rectifier circuit according to claim 1, further comprising a bias voltage source configured to include a fourth MOS transistor, and generates the bias voltage from a gate-to-source voltage of the fourth MOS transistor.

3. The rectifier circuit according to claim 1, further comprising a reference voltage source configured to generate a reference voltage lower than the bias voltage, wherein the bias setting circuit generates the control signal based on a result of comparison of the reference voltage and the potential of the third capacitor.

4. The rectifier circuit according to claim 3, wherein the reference voltage source includes a fifth MOS transistor, and generates the reference voltage from a gate-to-source voltage of the fifth MOS transistor.

5. The rectifier circuit according to claim 1, wherein the bias setting circuit supplies the bias voltage to the third capacitor in response to a reset signal for initializing a voltage across the third capacitor.

6. The rectifier circuit according to claim 5, wherein the rectifier circuit supplies the bias voltage to the first capacitor in response to the reset signal.

7. The rectifier circuit according to claim 5, further comprising a power detector circuit configured to generate the reset signal in response to detection of a power supply voltage for the rectifier circuit.

8. The rectifier circuit according to claim 1, wherein a source of the third MOS transistor is grounded.

9. The rectifier circuit according to claim 1, wherein a source of the third MOS transistor has a potential between a power supply potential and the ground potential.

10. The rectifier circuit according to claim 1, further comprising:

a logic circuit configured to generate a logic signal based on the control signal and a signal delayed by a predetermined time to the control signal; and an inverter circuit configured to supply one of the ground potential and a potential between a power supply potential and the ground potential to a source of the third MOS transistor in response to the logic signal.

11. The rectifier circuit according to claim 10, wherein the predetermined time is a time required to have supplied the bias voltage to the third capacitor through the dummy switching circuit.

12. The rectifier circuit according to claim 1, wherein the bias setting circuit further includes a current supply circuit for supplying a predetermined current to one end of the third capacitor, and generates the control signal based on a potential of the third capacitor increased with the predetermined current flowing therein.

13. The rectifier circuit according to claim 12, wherein the first switching circuit includes a MOS transistor for supplying the bias voltage to the first capacitor in response to the control signal, the second switching circuit includes a MOS transistor for supplying the bias voltage to the second capacitor in response to the control signal, and the predetermined current corresponds to a leakage current of the MOS transistor in the first switching circuit.

14. The rectifier circuit according to claim 12, wherein the bias setting circuit further includes a fourth MOS transistor imitating the first transistor, a fourth capacitor imitating the first capacitor, and a second dummy switching circuit for supplying the bias voltage to the fourth capacitor in response to the control signal, and generates the control signal based on potentials of the third capacitor and the fourth capacitor.

15. The rectifier circuit according to claim 1, wherein the switching circuit includes a fifth MOS transistor for supplying the bias voltage to the first capacitor in response to the control signal, and the dummy switching circuit includes a sixth MOS transistor imitating the fifth MOS transistor and being larger in scale than the fifth MOS transistor.

16. A radio frequency identification tag comprising:

an antenna;

a first MOS transistor;

a first capacitor configured to connect between a gate and a source of the first MOS transistor;

a first switching circuit configured to supply a bias voltage to the first capacitor in response to a control signal;

a second MOS transistor whose drain is connected to the source of the first MOS transistor;

a second capacitor configured to connect between a gate and a source of the second MOS transistor;

a second switching circuit configured to supply the bias voltage to the second capacitor in response to the control signal;

a third MOS transistor configured to imitate the first MOS transistor;

a third capacitor configured to imitate the first capacitor;

a fourth capacitor connected between a drain of the first MOS transistor and the source of the second MOS transistor;

a dummy switching circuit configured to supply the bias voltage to the third capacitor in response to the control signal;

a generating unit configured to generate the control signal based on a potential of the third capacitor;

a battery configured to be charged with a direct current supplied through the fourth capacitor with respect to an alternating current supplied to the source of the first MOS transistor; and a control circuit configured to transmit tag identification information via the antenna based on the direct current.

17. The radio frequency identification tag according to the claim 16, further comprising a sensor, wherein the control circuit transmits a signal output from the sensor via the antenna.

18. A radio frequency identification tag comprising:

an antenna;

a first MOS transistor;

a first capacitor configured to connect between a gate and a source of the first MOS transistor;

a first switching circuit configured to supply a bias voltage to the first capacitor in response to a control signal;

a second MOS transistor whose drain is connected to the source of the first MOS transistor;

a second capacitor configured to connect between a gate and a source of the second MOS transistor;

a second switching circuit configured to supply the bias voltage to the second capacitor in response to the control signal;

a third MOS transistor configured to imitate the first MOS transistor;

a third capacitor configured to imitate the first capacitor;

a fourth capacitor connected between a drain of the first MOS transistor and the source of the second MOS transistor;

a dummy switching circuit configured to supply the bias voltage to the third capacitor in response to the control signal;

a generating unit configured to generate the control signal based on a potential of the third capacitor;

a supplying unit configured to supply the bias voltage to the third capacitor in response to a reset signal;

a battery configured to be charged with a direct current supplied through the fourth capacitor with respect to an alternating current supplied to the source of the first MOS transistor; and a control circuit configured to transmit tag identification information via the antenna based on the direct current, and outputs the reset signal when the control circuit enters suspend state from running state.

19. The radio frequency identification tag according to the claim 18, further comprising a sensor, wherein the control circuit transmits a signal output from the sensor via the antenna.

* * * * *